(12) United States Patent
Forgeron et al.

(10) Patent No.: US 12,521,908 B2
(45) Date of Patent: Jan. 13, 2026

(54) METHODS AND COMPOSITIONS FOR DELIVERY OF CARBON DIOXIDE

(71) Applicant: CARBONCURE TECHNOLOGIES INC., Dartmouth (CA)

(72) Inventors: Dean Paul Forgeron, White's Lake (CA); Brad Vickers, Bedford (CA); Brandon Burns, Beaverbank (CA); Josh Brown, Hamilton (CA); George Sean Monkman, Halifax (CA); Kevin Cail, Sarasota, FL (US)

(73) Assignee: CARBONCURE TECHNOLOGIES INC., Dartmouth (CA)

( * ) Notice: Subject to any disclaimer, the term of this patent is extended or adjusted under 35 U.S.C. 154(b) by 946 days.

(21) Appl. No.: 17/346,124

(22) Filed: Jun. 11, 2021

(65) Prior Publication Data
US 2022/0001578 A1  Jan. 6, 2022

Related U.S. Application Data

(60) Provisional application No. 62/705,130, filed on Jun. 12, 2020.

(51) Int. Cl.
| B28C 7/12 | (2006.01) |
| B28C 5/42 | (2006.01) |
| B28C 7/00 | (2006.01) |

(52) U.S. Cl.
CPC .............. *B28C 7/128* (2013.01); *B28C 5/422* (2013.01); *B28C 7/003* (2013.01)

(58) Field of Classification Search
CPC ..... C04B 40/0032; C04B 22/06; C04B 22/10; C04B 40/0231; B01F 35/2111; B01F 35/21111; B01F 35/2113; B01F 35/2115; B01F 2101/28; B28C 5/422; B28C 5/4237; B28C 5/46; B28C 7/12; B28C 7/128; B28C 7/003; B28C 5/468; G01F 1/00; G01F 1/86; Y02P 40/18; B01J 4/02; C01B 32/55

See application file for complete search history.

(56) References Cited

U.S. PATENT DOCUMENTS

| 128,980 A | 7/1872 | Rowland |
| 170,594 A | 11/1875 | Richardson |
| 461,888 A | 10/1891 | Richardson |
| 1,932,150 A | 10/1933 | Tada |
| 2,254,016 A | 8/1941 | Melton et al. |
| 2,259,830 A | 10/1941 | Osborne |
| 2,329,940 A | 9/1943 | Ponzer |
| 2,496,895 A | 2/1950 | Staley |
| 2,498,513 A | 2/1950 | Cuypers |
| 2,603,352 A | 7/1952 | Tromp |
| 3,002,248 A | 10/1961 | Willson |
| 3,184,037 A | 5/1965 | Greaves et al. |
| 3,356,779 A | 12/1967 | Schulze |
| 3,358,342 A | 12/1967 | Spence |
| 3,442,498 A | 5/1969 | Noah |
| 3,468,993 A | 9/1969 | Knud |
| 3,492,385 A | 1/1970 | Branko |
| 3,667,242 A | 6/1972 | Robert |
| 3,752,314 A | 8/1973 | Brown et al. |
| 3,757,631 A | 9/1973 | Mc et al. |
| 3,917,236 A | 11/1975 | Hanson |
| 3,957,203 A | 5/1976 | Bullard |
| 3,976,445 A | 8/1976 | Douglas et al. |
| 4,068,755 A | 1/1978 | Parkes et al. |
| 4,069,063 A | 1/1978 | Ball |
| 4,076,782 A | 2/1978 | Yazawa et al. |
| 4,093,690 A | 6/1978 | Murray |
| 4,111,671 A | 9/1978 | Williamson |
| 4,117,060 A | 9/1978 | Murray |
| 4,257,710 A | 3/1981 | Delcoigne et al. |
| 4,266,921 A | 5/1981 | Murray |
| 4,275,836 A | 6/1981 | Egger |
| 4,350,567 A | 9/1982 | Moorehead et al. |
| 4,362,679 A | 12/1982 | Malinowski |
| 4,375,755 A | 3/1983 | Barbini et al. |
| 4,420,868 A | 12/1983 | Mcewen et al. |
| 4,427,610 A | 1/1984 | Murray |
| 4,436,498 A | 3/1984 | Murray |
| 4,444,023 A | 4/1984 | Barbini et al. |

(Continued)

FOREIGN PATENT DOCUMENTS

| AT | 388369 B | 11/1998 |
| AU | 2397377 A | 10/1978 |

(Continued)

OTHER PUBLICATIONS

U.S. Pat. No. 8,845,940, B2, U.S. Appl. No. 13/660,447, Niven et al., Sep. 30, 2014.
U.S. Pat. No. 9,108,883, B2, U.S. Appl. No. 14/249,308, Forgeron et al., Aug. 18, 2015.
U.S. Pat. No. 9,376,345, B2, U.S. Appl. No. 14/642,536, Forgeron et al., Jun. 28, 2016.
U.S. Pat. No. 9,388,072, B2, U.S. Appl. No. 14/701,456, Niven et al., Jul. 12, 2016.
U.S. Pat. No. 9,463,580, B2, U.S. Appl. No. 14/796,751, Forgeron et al., Oct. 11, 2016.
U.S. Pat. No. 9,492,945, B2, U.S. Appl. No. 14/282,965, Niven et al., Nov. 15, 2016.
U.S. Pat. No. 9,738,562, B2, U.S. Appl. No. 15/157,205, Monkman et al., Aug. 22, 2017.
U.S. Pat. No. 9,758,437, B2, U.S. Appl. No. 15/161,927, Forgeron et al., Sep. 12, 2017.
U.S. Pat. No. 9,790,131, B2, U.S. Appl. No. 15/434,429, Lee et al., Oct. 17, 2017

(Continued)

*Primary Examiner* — Charles Cooley
(74) *Attorney, Agent, or Firm* — Storella & Witt, LLP

(57) ABSTRACT

Provided herein are methods, apparatus, and systems for delivering carbon dioxide as a mixture of solid and gaseous carbon dioxide to a destination. In particular, provided herein are kits for retrofitting a concrete operation to supply gaseous and solid carbon dioxide to concrete in the operation, where the kit includes a conduit to connect to a source of liquid carbon dioxide and to a carbon dioxide injector, the carbon dioxide injector, a second conduit to connect with the carbon dioxide injector, a third conduit to connect with the second conduit, and an intermediate processing unit.

10 Claims, 2 Drawing Sheets

(56) References Cited

U.S. PATENT DOCUMENTS

| | | |
|---|---|---|
| 4,526,534 A | 7/1985 | Wollmann |
| 4,588,299 A | 5/1986 | Brown et al. |
| 4,609,303 A | 9/1986 | Shumaker |
| 4,613,472 A | 9/1986 | Svanholm |
| 4,746,481 A | 5/1988 | Schmidt |
| 4,772,439 A | 9/1988 | Trevino-Gonzalez |
| 4,789,244 A | 12/1988 | Dunton et al. |
| 4,846,580 A | 7/1989 | Oury |
| 4,881,347 A | 11/1989 | Mario et al. |
| 4,917,587 A | 4/1990 | Alpar et al. |
| 4,944,595 A | 7/1990 | Hodson |
| 5,051,217 A | 9/1991 | Alpar et al. |
| 5,125,979 A | 6/1992 | Swain et al. |
| 5,141,363 A | 8/1992 | Stephens |
| 5,158,996 A | 10/1992 | Valenti |
| 5,162,402 A | 11/1992 | Ogawa et al. |
| 5,203,919 A | 4/1993 | Bobrowski et al. |
| 5,220,732 A | 6/1993 | Lee |
| 5,232,496 A | 8/1993 | Jennings et al. |
| 5,244,498 A | 9/1993 | Steinke |
| 5,257,464 A | 11/1993 | Trevino-Gonzales |
| 5,298,475 A | 3/1994 | Shibata et al. |
| 5,352,035 A | 10/1994 | Macaulay et al. |
| 5,356,579 A | 10/1994 | Jennings et al. |
| 5,358,566 A | 10/1994 | Tanaka et al. |
| 5,360,660 A | 11/1994 | Nohlgren |
| 5,393,343 A | 2/1995 | Darwin et al. |
| 5,419,632 A | 5/1995 | Stephens |
| 5,427,617 A | 6/1995 | Bobrowski et al. |
| 5,453,123 A | 9/1995 | Burge et al. |
| 5,458,470 A | 10/1995 | Mannhart et al. |
| 5,494,516 A | 2/1996 | Drs et al. |
| 5,505,987 A | 4/1996 | Jennings et al. |
| 5,518,540 A | 5/1996 | Jones, Jr. |
| 5,556,033 A | 9/1996 | Nachtman |
| 5,583,183 A | 12/1996 | Darwin et al. |
| 5,609,681 A | 3/1997 | Drs et al. |
| 5,612,396 A | 3/1997 | Valenti et al. |
| 5,624,493 A | 4/1997 | Wagh et al. |
| 5,633,298 A | 5/1997 | Arfaei et al. |
| 5,643,978 A | 7/1997 | Darwin et al. |
| 5,650,562 A | 7/1997 | Jones, Jr. |
| 5,660,626 A | 8/1997 | Ohta et al. |
| 5,661,206 A | 8/1997 | Tanaka et al. |
| 5,665,158 A | 9/1997 | Darwin et al. |
| 5,667,298 A | 9/1997 | Musil et al. |
| 5,668,195 A | 9/1997 | Leikauf |
| 5,669,968 A | 9/1997 | Kobori et al. |
| 5,674,929 A | 10/1997 | Melbye |
| 5,676,905 A | 10/1997 | Andersen et al. |
| 5,690,729 A | 11/1997 | Jones, Jr. |
| 5,703,174 A | 12/1997 | Arfaei et al. |
| 5,725,657 A | 3/1998 | Darwin et al. |
| 5,728,207 A | 3/1998 | Arfaei et al. |
| 5,744,078 A | 4/1998 | Soroushian et al. |
| 5,752,768 A | 5/1998 | Assh |
| 5,753,744 A | 5/1998 | Darwin et al. |
| 5,798,425 A | 8/1998 | Albrecht et al. |
| 5,800,752 A | 9/1998 | Charlebois |
| 5,803,596 A | 9/1998 | Stephens |
| 5,804,175 A | 9/1998 | Ronin et al. |
| 5,840,114 A | 11/1998 | Jeknavorian et al. |
| 5,873,653 A | 2/1999 | Paetzold |
| 5,882,190 A | 3/1999 | Doumet |
| 5,885,478 A | 3/1999 | Montgomery et al. |
| 5,912,284 A | 6/1999 | Hirata et al. |
| 5,916,246 A | 6/1999 | Viegas et al. |
| 5,935,317 A | 8/1999 | Soroushian et al. |
| 5,944,359 A | 8/1999 | Andronaco |
| 5,947,600 A | 9/1999 | Maeda et al. |
| 5,965,201 A | 10/1999 | Jones, Jr. |
| 6,008,275 A | 12/1999 | Moreau et al. |
| 6,023,941 A | 2/2000 | Rhoades |
| 6,042,258 A | 3/2000 | Hines et al. |
| 6,042,259 A | 3/2000 | Hines et al. |
| 6,063,184 A | 5/2000 | Leikauf et al. |
| 6,066,262 A | 5/2000 | Montgomery et al. |
| 6,113,684 A | 9/2000 | Kunbargi |
| 6,136,950 A | 10/2000 | Vickers, Jr. et al. |
| 6,151,913 A | 11/2000 | Lewis et al. |
| 6,173,916 B1 | 1/2001 | Krone-Schmidt |
| 6,187,841 B1 | 2/2001 | Tanaka et al. |
| 6,264,736 B1 | 7/2001 | Knopf et al. |
| 6,267,494 B1 | 7/2001 | Burch |
| 6,267,814 B1 | 7/2001 | Bury et al. |
| 6,284,867 B1 | 9/2001 | Vickers, Jr. et al. |
| 6,290,770 B1 | 9/2001 | Moreau et al. |
| 6,310,143 B1 | 10/2001 | Vickers, Jr. et al. |
| 6,318,193 B1 | 11/2001 | Brock et al. |
| 6,334,895 B1 | 1/2002 | Bland |
| 6,372,157 B1 | 4/2002 | Krill, Jr. et al. |
| 6,387,174 B2 | 5/2002 | Knopf et al. |
| 6,418,948 B1* | 7/2002 | Harmon ................ B28C 5/468 |
| | | 134/198 |
| 6,451,105 B1 | 9/2002 | Turpin, Jr. |
| 6,463,958 B1 | 10/2002 | Schwing |
| 6,517,631 B2 | 2/2003 | Bland |
| 6,648,551 B1 | 11/2003 | Taylor |
| 6,682,655 B2 | 1/2004 | Beckham et al. |
| 6,871,667 B2 | 3/2005 | Schwing et al. |
| 6,890,497 B2 | 5/2005 | Rau et al. |
| 6,936,098 B2 | 8/2005 | Ronin |
| 6,960,311 B1 | 11/2005 | Mirsky et al. |
| 6,997,045 B2 | 2/2006 | Wallevik et al. |
| 7,003,965 B2 | 2/2006 | Auer et al. |
| 7,201,018 B2 | 4/2007 | Gershtein et al. |
| 7,390,444 B2 | 6/2008 | Ramme et al. |
| 7,399,378 B2 | 7/2008 | Edwards et al. |
| 7,419,051 B2 | 9/2008 | Damkjaer et al. |
| 7,549,493 B1 | 6/2009 | Jones |
| 7,588,661 B2 | 9/2009 | Edwards et al. |
| 7,635,434 B2 | 12/2009 | Mickelson et al. |
| 7,704,349 B2 | 4/2010 | Edwards et al. |
| 7,735,274 B2 | 6/2010 | Constantz et al. |
| 7,736,430 B2 | 6/2010 | Barron et al. |
| 7,771,684 B2 | 8/2010 | Constantz et al. |
| 7,815,880 B2 | 10/2010 | Constantz et al. |
| 7,879,146 B2 | 2/2011 | Raki et al. |
| 7,906,086 B2 | 3/2011 | Comrie |
| 7,914,685 B2 | 3/2011 | Constantz et al. |
| 7,922,809 B1 | 4/2011 | Constantz et al. |
| 7,950,841 B2* | 5/2011 | Klein ...................... B01F 35/91 |
| | | 366/4 |
| 7,966,250 B2 | 6/2011 | Constantz et al. |
| 8,006,446 B2 | 8/2011 | Constantz et al. |
| 8,043,426 B2 | 10/2011 | Mohamed et al. |
| 8,105,558 B2 | 1/2012 | Comrie |
| 8,114,214 B2 | 2/2012 | Constantz et al. |
| 8,114,367 B2 | 2/2012 | Riman et al. |
| 8,118,473 B2 | 2/2012 | Cooley et al. |
| 8,137,455 B1 | 3/2012 | Constantz et al. |
| 8,157,009 B2 | 4/2012 | Patil et al. |
| 8,177,909 B2 | 5/2012 | Constantz et al. |
| 8,192,542 B2 | 6/2012 | Virtanen |
| 8,235,576 B2* | 8/2012 | Klein ...................... B01F 35/91 |
| | | 366/144 |
| 8,272,205 B2 | 9/2012 | Estes et al. |
| 8,287,173 B2 | 10/2012 | Khouri |
| 8,311,678 B2 | 11/2012 | Koehler et al. |
| 8,313,802 B2 | 11/2012 | Riman et al. |
| 8,333,944 B2 | 12/2012 | Constantz et al. |
| 8,470,275 B2 | 6/2013 | Constantz et al. |
| 8,491,858 B2 | 7/2013 | Seeker et al. |
| 8,503,596 B2 | 8/2013 | Sheets |
| 8,518,176 B2 | 8/2013 | Silva et al. |
| 8,584,864 B2 | 11/2013 | Lee et al. |
| 8,708,547 B2* | 4/2014 | Bilger ................ C04B 40/0683 |
| | | 366/4 |
| 8,709,960 B2 | 4/2014 | Riman et al. |
| 8,721,784 B2 | 5/2014 | Riman et al. |
| 8,746,954 B2 | 6/2014 | Cooley et al. |
| 8,845,940 B2* | 9/2014 | Niven ...................... B28B 17/02 |
| | | 425/317 |
| 8,989,905 B2 | 3/2015 | Sostaric et al. |

(56) References Cited

U.S. PATENT DOCUMENTS

| | | | |
|---|---|---|---|
| 9,028,607 | B2 | 5/2015 | Ramme |
| 9,061,940 | B2 | 6/2015 | Chen et al. |
| 9,108,803 | B2 | 8/2015 | Till |
| 9,108,883 | B2 * | 8/2015 | Forgeron ................ B28C 9/002 |
| 9,376,345 | B2 * | 6/2016 | Forgeron ............ B01F 35/2111 |
| 9,388,072 | B1 * | 7/2016 | Niven ....................... C04B 7/02 |
| 9,429,558 | B2 | 8/2016 | Boncan et al. |
| 9,448,094 | B2 | 9/2016 | Downie et al. |
| 9,463,580 | B2 * | 10/2016 | Forgeron ................. B28C 5/18 |
| 9,492,945 | B2 * | 11/2016 | Niven ................ C04B 40/0231 |
| 9,738,562 | B2 * | 8/2017 | Monkman ............ B28C 5/1856 |
| 9,758,437 | B2 * | 9/2017 | Forgeron ................ C04B 22/10 |
| 9,790,131 | B2 | 10/2017 | Lee et al. |
| 10,246,379 | B2 * | 4/2019 | Niven ................ C04B 40/0231 |
| 10,350,787 | B2 * | 7/2019 | Forgeron ............ B01F 35/2132 |
| 10,392,305 | B2 | 8/2019 | Wang et al. |
| 10,570,064 | B2 * | 2/2020 | Monkman ............. B01D 53/02 |
| 10,654,191 | B2 * | 5/2020 | Niven ................... B28B 11/245 |
| 10,683,237 | B2 | 6/2020 | Lee et al. |
| 10,927,042 | B2 * | 2/2021 | Monkman ................ B28C 5/46 |
| 11,072,091 | B1 * | 7/2021 | Falco .................... C04B 38/10 |
| 11,090,700 | B1 * | 8/2021 | Camell ................ B05B 7/0876 |
| 11,660,779 | B2 * | 5/2023 | Monkman ............ C04B 40/029 |
| | | | 366/170.4 |
| 11,773,019 | B2 * | 10/2023 | Monkman ............... C04B 28/04 |
| | | | 366/3 |
| 11,773,031 | B2 * | 10/2023 | Forgeron ............ B01F 35/2113 |
| | | | 137/561 R |
| 11,878,948 | B2 * | 1/2024 | Monkman ........... C04B 40/0236 |
| 11,958,212 | B2 * | 4/2024 | Monkman ............ C04B 22/0046 |
| 12,319,626 | B2 * | 6/2025 | Forgeron ............ B01F 35/2111 |
| 12,319,628 | B2 * | 6/2025 | Niven ....................... C04B 7/02 |
| 12,325,669 | B2 * | 6/2025 | Monkman ................ C02F 1/66 |
| 12,330,336 | B2 * | 6/2025 | Monkman ............... B28C 5/003 |
| 12,421,169 | B2 * | 9/2025 | Thomas .................. C04B 7/367 |
| 2002/0019459 | A1 | 2/2002 | Albrecht et al. |
| 2002/0047225 | A1 | 4/2002 | Bruning et al. |
| 2002/0179119 | A1 * | 12/2002 | Harmon ................. B08B 9/093 |
| | | | 134/198 |
| 2003/0070448 | A1 | 4/2003 | Gasteyer et al. |
| 2003/0122273 | A1 | 7/2003 | Fifield |
| 2005/0131600 | A1 | 6/2005 | Quigley et al. |
| 2005/0219938 | A1 | 10/2005 | Rigaudon et al. |
| 2005/0219939 | A1 | 10/2005 | Christenson et al. |
| 2007/0114178 | A1 | 5/2007 | Coppola et al. |
| 2007/0170119 | A1 | 7/2007 | Mickelson et al. |
| 2007/0171764 | A1 * | 7/2007 | Klein ..................... B28C 5/468 |
| | | | 366/4 |
| 2007/0185636 | A1 | 8/2007 | Cooley et al. |
| 2007/0215353 | A1 | 9/2007 | Barron et al. |
| 2008/0092957 | A1 | 4/2008 | Rosaen |
| 2008/0174041 | A1 | 7/2008 | Firedman et al. |
| 2008/0183523 | A1 | 7/2008 | Dikeman |
| 2008/0202389 | A1 | 8/2008 | Hojaji et al. |
| 2008/0245274 | A1 | 10/2008 | Ramme |
| 2008/0264872 | A1 | 10/2008 | Konishi et al. |
| 2008/0275149 | A1 | 11/2008 | Ladely et al. |
| 2008/0308133 | A1 | 12/2008 | Grubb et al. |
| 2008/0316856 | A1 | 12/2008 | Cooley et al. |
| 2009/0044832 | A1 | 2/2009 | Leonardich et al. |
| 2009/0093328 | A1 | 4/2009 | Dickinger et al. |
| 2009/0103392 | A1 * | 4/2009 | Bilger .................... B28C 5/468 |
| | | | 366/4 |
| 2009/0143211 | A1 | 6/2009 | Riman et al. |
| 2009/0292572 | A1 | 11/2009 | Alden et al. |
| 2009/0294079 | A1 | 12/2009 | Edwards et al. |
| 2010/0086983 | A1 | 4/2010 | Gellett et al. |
| 2010/0132556 | A1 | 6/2010 | Constantz et al. |
| 2010/0239487 | A1 | 9/2010 | Constantz et al. |
| 2010/0246312 | A1 | 9/2010 | Welker et al. |
| 2011/0067600 | A1 | 3/2011 | Constantz et al. |
| 2011/0165400 | A1 | 7/2011 | Quaghebeur et al. |
| 2011/0198369 | A1 | 8/2011 | Klein et al. |
| 2011/0249527 | A1 | 10/2011 | Seiler et al. |
| 2011/0277670 | A1 | 11/2011 | Self et al. |
| 2011/0281333 | A1 | 11/2011 | Brown et al. |
| 2011/0289901 | A1 | 12/2011 | Estes et al. |
| 2011/0303551 | A1 | 12/2011 | Gilliam et al. |
| 2011/0320040 | A1 | 12/2011 | Koehler et al. |
| 2012/0031303 | A1 | 2/2012 | Constantz et al. |
| 2012/0111236 | A1 | 5/2012 | Constantz et al. |
| 2012/0152153 | A1 | 6/2012 | Gong et al. |
| 2012/0153153 | A1 | 6/2012 | Chang et al. |
| 2012/0238006 | A1 | 9/2012 | Gartner et al. |
| 2012/0290208 | A1 | 11/2012 | Jiang et al. |
| 2012/0298011 | A1 | 11/2012 | Silva et al. |
| 2012/0312194 | A1 | 12/2012 | Riman et al. |
| 2013/0036945 | A1 | 2/2013 | Constantz et al. |
| 2013/0104778 | A1 | 5/2013 | Lisowski et al. |
| 2013/0122267 | A1 | 5/2013 | Riman et al. |
| 2013/0125791 | A1 | 5/2013 | Fried et al. |
| 2013/0139727 | A1 | 6/2013 | Constantz et al. |
| 2013/0167756 | A1 | 7/2013 | Chen et al. |
| 2013/0284073 | A1 | 10/2013 | Gartner |
| 2013/0305963 | A1 | 11/2013 | Fridman |
| 2014/0034452 | A1 | 2/2014 | Lee et al. |
| 2014/0050611 | A1 | 2/2014 | Warren et al. |
| 2014/0069302 | A1 | 3/2014 | Saastamoinen et al. |
| 2014/0083514 | A1 | 3/2014 | Ding |
| 2014/0096704 | A1 | 4/2014 | Rademan et al. |
| 2014/0104972 | A1 | 4/2014 | Roberts et al. |
| 2014/0107844 | A1 | 4/2014 | Koehler et al. |
| 2014/0116295 | A1 * | 5/2014 | Niven ..................... B28B 17/02 |
| | | | 106/638 |
| 2014/0127450 | A1 | 5/2014 | Riman et al. |
| 2014/0197563 | A1 | 7/2014 | Niven et al. |
| 2014/0212941 | A1 | 7/2014 | Lee |
| 2014/0216303 | A1 | 8/2014 | Lee et al. |
| 2014/0327168 | A1 * | 11/2014 | Niven ..................... B28B 17/02 |
| | | | 425/445 |
| 2014/0373755 | A1 * | 12/2014 | Forgeron .............. B28C 5/4203 |
| | | | 106/638 |
| 2015/0023127 | A1 | 1/2015 | Chon et al. |
| 2015/0069656 | A1 | 3/2015 | Bowers et al. |
| 2015/0197447 | A1 * | 7/2015 | Forgeron ................ B28C 5/422 |
| | | | 137/561 R |
| 2015/0202579 | A1 | 7/2015 | Richardson et al. |
| 2015/0232381 | A1 * | 8/2015 | Niven ..................... B28C 5/462 |
| | | | 106/709 |
| 2015/0247212 | A1 | 9/2015 | Sakaguchi et al. |
| 2015/0274537 | A1 | 10/2015 | Myers et al. |
| 2015/0298351 | A1 | 10/2015 | Beaupré |
| 2015/0345034 | A1 | 12/2015 | Sundara et al. |
| 2015/0355049 | A1 | 12/2015 | Ait Abdelmalek et al. |
| 2016/0001462 | A1 * | 1/2016 | Forgeron .................. B28C 7/02 |
| | | | 700/265 |
| 2016/0046532 | A1 | 2/2016 | Juilland et al. |
| 2016/0107939 | A1 * | 4/2016 | Monkman ............... C04B 28/04 |
| | | | 366/12 |
| 2016/0185662 | A9 * | 6/2016 | Niven ....................... C04B 7/26 |
| | | | 106/709 |
| 2016/0272542 | A1 * | 9/2016 | Monkman .................. B28C 7/04 |
| 2016/0280598 | A1 | 9/2016 | Wang et al. |
| 2016/0280610 | A1 * | 9/2016 | Forgeron ................. G01F 1/00 |
| 2016/0340253 | A1 * | 11/2016 | Forgeron ................ B28C 7/024 |
| 2016/0355441 | A1 | 12/2016 | Tregger et al. |
| 2016/0355442 | A1 * | 12/2016 | Niven ..................... B28C 5/462 |
| 2017/0015598 | A1 * | 1/2017 | Monkman ........... C04B 40/0231 |
| 2017/0028586 | A1 | 2/2017 | Jordan et al. |
| 2017/0036372 | A1 * | 2/2017 | Sandberg ................ C04B 28/04 |
| 2017/0043499 | A1 * | 2/2017 | Forgeron ............ B01F 23/2319 |
| 2017/0158549 | A1 | 6/2017 | Yamada et al. |
| 2017/0158569 | A1 * | 6/2017 | Lee ......................... B01F 25/30 |
| 2017/0165870 | A1 * | 6/2017 | Niven ................ C04B 40/0231 |
| 2017/0217047 | A1 * | 8/2017 | Leon ...................... B28C 5/4231 |
| 2017/0252714 | A1 | 9/2017 | Bennett et al. |
| 2017/0283293 | A1 | 10/2017 | Shin et al. |
| 2018/0022654 | A1 * | 1/2018 | Forgeron ................. G01F 1/86 |
| | | | 137/561 R |
| 2018/0029934 | A1 * | 2/2018 | Monkman ........... C04B 40/0231 |
| 2018/0118622 | A1 * | 5/2018 | Monkman .................. B28C 7/02 |
| 2018/0252444 | A1 | 9/2018 | Nelson et al. |

(56) References Cited

U.S. PATENT DOCUMENTS

| | | | |
|---|---|---|---|
| 2018/0258000 A1 | 9/2018 | Lee et al. | |
| 2019/0077045 A1* | 3/2019 | Monkman | B01F 23/233 |
| 2019/0168416 A1* | 6/2019 | Monkman | B28C 7/02 |
| 2020/0124054 A1 | 4/2020 | Nagase et al. | |
| 2020/0165170 A1* | 5/2020 | Niven | C04B 7/02 |
| 2020/0223760 A1* | 7/2020 | Monkman | B01D 53/02 |
| 2020/0282595 A1* | 9/2020 | Monkman | B01F 25/53 |
| 2022/0001578 A1* | 1/2022 | Forgeron | B28C 5/468 |
| 2022/0013196 A1* | 1/2022 | Monkman | G01N 33/004 |
| 2022/0065527 A1* | 3/2022 | Forgeron | B28C 5/46 |
| 2022/0194852 A1* | 6/2022 | Thomas | B28C 5/388 |
| 2022/0415449 A9* | 12/2022 | Monkman | G16C 20/10 |
| 2023/0212085 A1* | 7/2023 | Monkman | B01D 53/02 |
| | | | 106/713 |
| 2023/0257312 A1* | 8/2023 | Niven | B28C 7/024 |
| | | | 106/762 |
| 2023/0406768 A1* | 12/2023 | Einarsdottir | C04B 18/167 |
| 2024/0025077 A1* | 1/2024 | Monkman | B28C 5/003 |
| 2024/0100737 A1* | 3/2024 | Monkman | B28C 5/00 |
| 2024/0116813 A1* | 4/2024 | Monkman | C04B 28/08 |
| 2024/0124366 A1* | 4/2024 | Forgeron | C04B 22/10 |
| 2024/0360035 A1* | 10/2024 | Thomas | C04B 7/367 |
| 2024/0425412 A1* | 12/2024 | Forgeron | B01D 53/62 |
| 2025/0114973 A1* | 4/2025 | Monkman | B01F 25/53 |
| 2025/0187229 A1* | 6/2025 | Monkman | C04B 28/08 |
| 2025/0191701 A1* | 6/2025 | Monkman | G01N 33/383 |
| 2025/0276940 A1* | 9/2025 | Niven | C04B 7/26 |
| 2025/0289767 A1* | 9/2025 | Forgeron | C04B 40/0231 |

FOREIGN PATENT DOCUMENTS

| | | |
|---|---|---|
| AU | 504446 B2 | 10/1979 |
| AU | 2017249444 A1 | 11/2018 |
| CA | 970935 A1 | 7/1975 |
| CA | 1045073 A | 12/1978 |
| CA | 1072440 A | 2/1980 |
| CA | 1185078 A1 | 4/1985 |
| CA | 2027216 A1 | 4/1991 |
| CA | 2343021 A1 | 3/2000 |
| CA | 2362631 A1 | 8/2000 |
| CA | 2598583 A1 | 9/2006 |
| CA | 2646462 A1 | 9/2007 |
| CA | 2630226 A1 | 10/2008 |
| CA | 2659447 A1 | 12/2008 |
| CA | 2703343 A1 | 4/2009 |
| CA | 2705857 A1 | 5/2009 |
| CA | 2670049 A1 | 11/2009 |
| CA | 2668249 A1 | 12/2009 |
| CA | 2778508 A1 | 6/2011 |
| CA | 2785143 A1 | 7/2011 |
| CA | 2501329 C | 6/2012 |
| CA | 2829320 A1 | 9/2012 |
| CA | 2837832 A1 | 12/2012 |
| CA | 2943791 A1 | 10/2015 |
| CA | 3019860 A1 | 10/2017 |
| CA | 3068082 A1 | 12/2018 |
| CN | 2055815 U | 4/1990 |
| CN | 1114007 A | 12/1995 |
| CN | 1267632 A | 9/2000 |
| CN | 2445047 Y | 8/2001 |
| CN | 1357506 A | 7/2002 |
| CN | 2575406 Y | 9/2003 |
| CN | 2700294 Y | 5/2005 |
| CN | 2702958 Y | 6/2005 |
| CN | 2748574 Y | 12/2005 |
| CN | 1735468 A | 2/2006 |
| CN | 1916332 A | 2/2007 |
| CN | 2893360 Y | 4/2007 |
| CN | 2913278 Y | 6/2007 |
| CN | 200961340 Y | 10/2007 |
| CN | 101099596 A | 1/2008 |
| CN | 101319512 A | 12/2008 |
| CN | 101538813 A | 9/2009 |
| CN | 101551001 A | 10/2009 |
| CN | 201325866 Y | 10/2009 |
| CN | 101844826 A | 9/2010 |
| CN | 203357623 U | 12/2013 |
| CN | 105102370 A | 11/2015 |
| CN | 104045251 B | 6/2016 |
| CN | 105174766 B | 5/2017 |
| CN | 107814530 A | 3/2018 |
| CN | 107935507 A | 4/2018 |
| CN | 106746828 B | 5/2019 |
| CN | 110590260 A | 12/2019 |
| DE | 1817001 A1 | 11/1970 |
| DE | 3139107 A1 | 4/1983 |
| DE | 19506411 A1 | 8/1996 |
| DE | 20305552 U1 | 10/2003 |
| EP | 0047675 A1 | 3/1982 |
| EP | 0218189 A2 | 4/1987 |
| EP | 0151164 B1 | 5/1988 |
| EP | 0218189 A3 | 5/1988 |
| EP | 0629597 A1 | 12/1994 |
| EP | 0639650 A1 | 2/1995 |
| EP | 0573524 B1 | 5/1996 |
| EP | 0701503 B1 | 8/2000 |
| EP | 1429096 A2 | 6/2004 |
| EP | 1785245 A1 | 5/2007 |
| EP | 2012149 A1 | 1/2009 |
| EP | 2012150 A1 | 1/2009 |
| EP | 2039589 A1 | 3/2009 |
| EP | 2040135 A2 | 3/2009 |
| EP | 2042326 A2 | 4/2009 |
| EP | 2043169 A2 | 4/2009 |
| EP | 2048525 A1 | 4/2009 |
| EP | 2096498 A1 | 9/2009 |
| EP | 2098362 A1 | 9/2009 |
| EP | 2116841 A1 | 11/2009 |
| EP | 2123700 A1 | 11/2009 |
| EP | 2123942 B1 | 4/2011 |
| EP | 2123465 B1 | 7/2011 |
| EP | 2042317 B1 | 8/2011 |
| EP | 2162639 B1 | 9/2011 |
| EP | 2162640 B1 | 9/2011 |
| EP | 2042535 B1 | 10/2011 |
| EP | 2042324 B1 | 6/2012 |
| EP | 2039393 B1 | 8/2012 |
| EP | 2511003 A1 | 10/2012 |
| EP | 1749629 B1 | 5/2013 |
| EP | 2123441 B1 | 7/2013 |
| EP | 2107000 B1 | 9/2013 |
| EP | 2031010 B1 | 4/2014 |
| EP | 2123808 B1 | 5/2014 |
| EP | 2036952 B1 | 4/2016 |
| EP | 3013544 A1 | 5/2016 |
| EP | 2387551 B1 | 7/2016 |
| EP | 1985754 B1 | 8/2016 |
| EP | 3081842 A1 | 10/2016 |
| EP | 3442761 A1 | 2/2019 |
| EP | 3744700 B1 | 7/2022 |
| ES | 2140302 A1 | 2/2000 |
| FR | 1259819 A | 4/1961 |
| FR | 2121975 A5 | 8/1972 |
| FR | 2281815 A1 | 3/1976 |
| FR | 2503135 A1 | 10/1982 |
| FR | 2513932 A1 | 4/1983 |
| FR | 2735804 A1 | 12/1996 |
| FR | 2805532 A1 | 8/2001 |
| FR | 2969997 B1 | 3/2015 |
| GB | 217791 A | 6/1924 |
| GB | 574724 A | 1/1946 |
| GB | 644615 A | 10/1950 |
| GB | 851222 A | 10/1960 |
| GB | 1167927 A | 10/1969 |
| GB | 1199069 A | 7/1970 |
| GB | 1337014 A | 11/1973 |
| GB | 1460284 A | 12/1976 |
| GB | 1549633 A | 8/1979 |
| GB | 2106886 A | 4/1983 |
| GB | 2192392 A | 1/1988 |
| GB | 2246523 A | 2/1992 |
| GB | 2300631 A | 11/1996 |
| GB | 2302090 A | 1/1997 |

(56) References Cited

FOREIGN PATENT DOCUMENTS

| | | |
|---|---|---|
| GB | 2392502 A | 3/2004 |
| GB | 2467005 A | 7/2010 |
| JP | S53142542 U | 12/1978 |
| JP | S56115423 A | 9/1981 |
| JP | S5850197 A | 3/1983 |
| JP | S60187354 A | 9/1985 |
| JP | S6150654 A | 3/1986 |
| JP | S62122710 A | 6/1987 |
| JP | S6426403 A | 1/1989 |
| JP | H0218368 A | 1/1990 |
| JP | H0254504 U | 4/1990 |
| JP | H05116135 A | 5/1993 |
| JP | H05117012 A | 5/1993 |
| JP | H05238791 A | 9/1993 |
| JP | H0624329 A | 2/1994 |
| JP | H06144944 A | 5/1994 |
| JP | H06263562 A | 9/1994 |
| JP | H0748186 A | 2/1995 |
| JP | H07275899 A | 10/1995 |
| JP | H0835281 A | 2/1996 |
| JP | H0960103 A | 3/1997 |
| JP | H09124099 A | 5/1997 |
| JP | H10194798 A | 7/1998 |
| JP | 1999324324 A | 11/1999 |
| JP | H11303398 A | 11/1999 |
| JP | H11324324 A | 11/1999 |
| JP | 2000203964 A | 7/2000 |
| JP | 2000247711 A | 9/2000 |
| JP | 2000281467 A | 10/2000 |
| JP | 2001026418 A | 1/2001 |
| JP | 2001170659 A | 6/2001 |
| JP | 2002012480 A | 1/2002 |
| JP | 2002127122 A | 5/2002 |
| JP | 3311436 B2 | 8/2002 |
| JP | 2003206122 A | 7/2003 |
| JP | 2003326232 A | 11/2003 |
| JP | 2005023692 A | 1/2005 |
| JP | 2005273720 A | 10/2005 |
| JP | 2007326881 A | 12/2007 |
| JP | 2008096409 A | 4/2008 |
| JP | 3147769 U | 1/2009 |
| JP | 2009115209 A | 5/2009 |
| JP | 2009136770 A | 6/2009 |
| JP | 4313352 B2 | 8/2009 |
| JP | 2010125386 A | 6/2010 |
| JP | 2010227741 A | 10/2010 |
| JP | 2011073891 A | 4/2011 |
| JP | 2014213479 A | 11/2014 |
| JP | 2017070891 A | 4/2017 |
| JP | 2017074552 A | 4/2017 |
| KR | 20020006222 A | 1/2002 |
| KR | 20020042569 A | 6/2002 |
| KR | 20020090354 A | 12/2002 |
| KR | 20030004243 A | 1/2003 |
| KR | 20060010678 A | 2/2006 |
| KR | 20060064557 A | 6/2006 |
| KR | 100766364 B1 | 10/2007 |
| KR | 100950009 B1 | 3/2010 |
| KR | 20110048266 A | 5/2011 |
| MX | 2018012464 A | 8/2019 |
| NZ | 183790 A | 9/1980 |
| RU | 2168412 C2 | 6/2001 |
| RU | 2212125 C2 | 9/2003 |
| RU | 2351469 C2 | 4/2009 |
| SE | 8002613 L | 3/1982 |
| SE | 451067 B | 8/1987 |
| SU | 1031728 A2 | 7/1983 |
| TW | I257330 B | 7/2006 |
| WO | WO-7900473 A1 | 7/1979 |
| WO | WO-8500587 A1 | 2/1985 |
| WO | WO-9105644 A1 | 5/1991 |
| WO | WO-9215753 A2 | 9/1992 |
| WO | WO-9319347 A1 | 9/1993 |
| WO | WO-9427797 A1 | 12/1994 |
| WO | WO-2001064348 A1 | 9/2001 |
| WO | WO-0190020 A2 | 11/2001 |
| WO | WO-2004033793 A2 | 4/2004 |
| WO | WO-2004074733 A1 | 9/2004 |
| WO | WO-2005025768 A1 | 3/2005 |
| WO | WO-2006040503 A1 | 4/2006 |
| WO | WO-2006100550 A1 | 9/2006 |
| WO | WO-2006100693 A1 | 9/2006 |
| WO | 2008057275 A2 | 5/2008 |
| WO | WO-2008149389 A1 | 12/2008 |
| WO | WO-2008149390 A1 | 12/2008 |
| WO | WO-2009078430 A1 | 6/2009 |
| WO | 2009089906 A1 | 7/2009 |
| WO | WO-2009132692 A1 | 11/2009 |
| WO | 2010048457 A1 | 4/2010 |
| WO | WO-2010074811 A1 | 7/2010 |
| WO | 2010110563 A2 | 9/2010 |
| WO | 2012081486 A2 | 6/2012 |
| WO | WO-2012079173 A1 | 6/2012 |
| WO | WO-2013011092 A1 | 1/2013 |
| WO | WO-2014021884 A1 | 2/2014 |
| WO | WO-2014026794 A1 | 2/2014 |
| WO | WO-2014063242 A1 | 5/2014 |
| WO | 2014121198 A1 | 8/2014 |
| WO | 2014154741 A1 | 10/2014 |
| WO | 2014205577 A1 | 12/2014 |
| WO | WO-2015123769 A1 | 8/2015 |
| WO | WO-2015/154174 | 10/2015 |
| WO | WO-2015154162 A1 | 10/2015 |
| WO | WO-2016041054 A1 | 3/2016 |
| WO | 2016082030 A1 | 6/2016 |
| WO | WO-2016082030 | 6/2016 |
| WO | WO-2017000075 A1 | 1/2017 |
| WO | WO-2017041176 | 3/2017 |
| WO | 2017177324 A1 | 10/2017 |
| WO | 2017209025 A1 | 12/2017 |
| WO | WO-2018232507 A1 | 12/2018 |
| WO | 2019068178 A1 | 4/2019 |
| WO | 2020124054 A1 | 6/2020 |
| WO | 2020239683 A1 | 12/2020 |
| WO | 2021028581 A1 | 2/2021 |
| WO | WO-2021250640 A1 * | 12/2021 ............... B01J 4/02 |
| WO | 2024030519 A2 | 2/2024 |

OTHER PUBLICATIONS

. U.S. Pat. No. 10,246,379, B2, U.S. Appl. No. 15/170,018, Niven et al., Apr. 2, 2019.
U.S. Pat. No. 10,350,787, B2, U.S. Appl. No. 15/240,954, Forgeron et al., Jul. 16, 2019.
U.S. Pat. No. 10,570,064, B2, U.S. Appl. No. 15/184,219, Monkman et al., Feb. 25, 2020.
U.S. Pat. No. 10,654,191, B2, U.S. Appl. No. 15/284,186, Niven et al., May 19, 2020.
U.S. Pat. No. 10,683,237, B2, U.S. Appl. No. 15/828,240, Lee et al., Jun. 16, 2020.
U.S. Pat. No. 10,927,042, B2, U.S. Appl. No. 15/650,524, Monkman et al., Feb. 23, 2021.
2018-0118622, A1, U.S. Appl. No. 15/703,522, Monkman et al., May 3, 2018.
2018-0022654, A1, U.S. Appl. No. 15/659,334, Forgeron et al., Jan. 25, 2018.
2019-0168416, A1, U.S. Appl. No. 16/155,013, Monkman et al., Jun. 6, 2019.
2020-0165170, A1, U.S. Appl. No. 16/249,012, Niven et al., May 28, 2020.
2020-0223760, A1, U.S. Appl. No. 16/683,416, Monkman et al., Jul. 16, 2020.
2020-0282595, A1, U.S. Appl. No. 16/624,776, Monkman et al., Sep. 10, 2020.
2022-0013196, A1, U.S. Appl. No. 17/369,911, Monkman et al., Jan. 13, 2022.
2022-0065527, A1, U.S. Appl. No. 17/413,174, Forgeron et al., Mar. 3, 2022.
2022-0194852, A1, U.S. Appl. No. 17/606,415, Thomas et al., Jun. 23, 2022.
U.S. Appl. No. 17/959,013, Niven et al., filed Oct. 3, 2022.

(56) References Cited

OTHER PUBLICATIONS

ASTM International, "Standard Test Method for Slump of Hydraulic-Cement Concrete," Designation: C143/C143M—15a, Revised 5.1.1., Dec. 15, 2015, 4 pages.
Canadian Intellectual Property Office, Canadian Office Action for Application No. 2,943,791 dated Apr. 22, 2021, 3 pages.
Canadian Intellectual Property Office, Canadian Office Action for Application No. 2,943,791 dated May 27, 2022, 3 pages.
Canadian Intellectual Property Office, Canadian Office Action for Application No. 2,943,791 dated Nov. 25, 2021, 4 pages.
Canadian Intellectual Property Office, Canadian Office Action for Application No. 2,945,060, dated Jan. 20, 2022, 4 pages.
Canadian Intellectual Property Office, Canadian Office Action for Application No. 2,979,471 dated Jul. 10, 2020, 3 pages.
Canadian Intellectual Property Office, Canadian Office Action for Application No. 3,120,472 dated Apr. 22, 2022, 3 pages.
Canadian Intellectual Property Office, Canadian Office Action for Application No. 3,120,472 dated Oct. 12, 2022, 4 pages.
Canadian Patent Office, Examination Search Report for CA 2,968,246, dated Aug. 18, 2022, 3 pages.
Chile Patent Office, First Office Action and Translation for Application No. 3376-2020, dated Nov. 18, 2021, 34 Pages.
Chile Patent Office, First Office Action for Application No. 3804-2019, dated Mar. 30, 2021, 24 Pages.
Chile Patent Office, Second Examination Report with English Transmittal for Application No. 3376-2020, dated May 16, 2022, 21 Pages.
Chinese International Search Report for Application No. 2019800306982, dated Mar. 25, 2022, 2 pages.
Corrected First Office Action for Chilean Application No. 3804-2019, mailed Aug. 31, 2021, 51 pages.
European Communication for European Application No. 17781677.4, dated May 9, 2022, 5 pages.
Examination Report and translation for Brazilian Application No. 112017010897-6 dated Nov. 23, 2021; 7 pages.
Examination Report for Australian Application No. 2017249444 mailed Jul. 28, 2021, 6 pages.
Examination Report for Australian Application No. 2018288555 mailed Feb. 20, 2021, 5 pages.
Examination Report for Australian Application No. 2018288555 mailed Aug. 9, 2021, 5 pages.
Examination Report for Canadian Application No. 2945060 mailed Apr. 19, 2021, 3 pages.
Examination Report for Canadian Application No. 2968246 mailed Oct. 22, 2021, 4 pages.
Examination Report for EP 15777459.7 mailed Apr. 17, 2020, 7 pages.
Examination Report for European Application No. 17781677.4 dated May 9, 2022; 5 pages.
Examination Report for Indian Application No. 201817042016 mailed Mar. 4, 2021, 5 pages.
Examination Report for Indian Application No. 201917054847 mailed Apr. 20, 2021, 7 pages.
Examination Report for Japanese Application No. JP 2019-571536 mailed Aug. 26, 2021, 86 pages.
Examination Report for Singapore Application No. 11201912759R mailed Dec. 18, 2021, 5 pages.
Extended European Search Report dated Aug. 18, 2020, for European patent application No. 19207508.3, 9 pages.
Extended European Search Report dated Oct. 8, 2018, for European patent application No. EP15862209.2, 10 pages.
Extended European Search Report for EP 19894565.1, Date Aug. 3, 2022.
Extended European Search Report for European Application No. 18820477.0 mailed Feb. 5, 2021, 11 pages.
Singapore, First Written Opinion, issued by the Intellectual Property Office of Singapore, dated Mar. 3, 2020, for Singapore patent application No. 11201810010P, 8 pages.

Ghacham, "Valorization of waste concrete through CO2 mineral carbonation: optimizing parameter and improving reactivity using concrete separation". Journal of Cleaner Production, 2019, vol. 166, pp. 1-10.
Ho et al., "CO2 Utilization via Direct Aqueous Carbonation of Synthesized Concrete Fines under Atmospheric Pressure". ACS Omega, Jun. 22, 2020 (Jun. 22, 2020), vol. 5, pp. 15877-15890.
India, Examination Report for Application No. 202127030664 dated Dec. 15, 2022, 7 pages.
Indonesia Application No. P00202105311 Substantive Examination Results Stage I dated Jan. 11, 2023, 8 pages.
International Search Report and Written Opinion dated Jan. 13, 2021 for PCT Application No. PCT/US20/54625, 6 pages.
International Search Report and Written Opinion dated Oct. 19, 2021 for PCT Application No. PCT/US21/40764, 11 pages.
International Search Report and Written Opinion dated May 14, 2020 for PCT application No. PCT/US2019/066407, 11 bages.
International Search Report and Written Opinion dated Jul. 22, 2020 for PCT/IB2020/053953, 12 pages.
International Search Report and Written Opinion dated Mar. 29, 2022 for PCT Application No. PCT/IB2021/000718.
International Search Report and Written Opinion dated Aug. 25, 2021 for PCT Application No. PCT/IB2021/055223.
International Search Report and Written Opinion dated Sep. 6, 2018 for PCT/CA2018/050750, 13 pages.
Japanese Patent Application No. 2019-571536, Notice of Reasons for Rejection, (Translation) dated Jun. 8, 2022, 5 pages.
Liang et al., "Utilization of CO2 curing to enhance the properties of recycled aggregate and prepared concrete: A review". Cement and Concrete Composites, Nov. 1, 2019 (Jan. 11, 2019), vol. 105, pp. 1-14 * Abstract;* Section 1.0; * Section 2.2.4; * Fig. 4(d).
Liu, J. et al., "Development of a Co2 solidification method for recycling autoclaved lightweight concrete waste", Journal of Materials Science Letters 20, 2001, pp. 1791-1794.
Lu et al., "Carbon Dioxide Sequestration on Recycled Aggregates," Carbon Dioxide Sequestration in Cementitious Construction Materials, Woodhead Publishing Series in Civil and Structural Engineering, 2018, pp. 247-277.
Lu et al., "Effects of Carbonated Hardened Cement Paste Powder on Hydration and Microstructure of Portland Cement," Construction and Building Materials, 186, pp. 699-708 (2018).
Mexican Office Action for Application No. MX/a/2017/006746 dated Dec. 1, 2022, 5 pages [Translation].
Morocco Patent Application No. 53762 Search Report with Opinion on Patentability, dated Jul. 1, 2022, 4 pages.
Australian Patent Office; Examination Report for European Application No. 2022201059 dated May 22, 2023; 4 pages.
Mexican Patent Office, Application No. MX/a/2017/006746 office action dated May 8, 2023, 8 pages.
Monkman, Sean G. Investigating carbon dioxide sequestration in fresh ready mixed concrete, Eco-Crete, Internationalsymposium on Sustainability Aug. 13, 2014, 22 pages.
EP17781677.4 Extended European Search Report dated Nov. 12, 2019.
U.S. Appl. No. 15/304,208 Office Action dated Oct. 25, 2019.
U.S. Appl. No. 15/650,524 Office Action dated Sep. 17, 2019.
Cheung et al. Impact of admixtures on the hydration kinetics of Portland cement. Cement and Concrete Research 41:1289-1309 (2011).
Co-pending U.S. Appl. No. 16/249,012, filed Jan. 16, 2019.
Cornerstone Custom Concrete, LLC. "How Much Does Concrete Weigh?" Retrieved Jul. 15, 2019. <web.archive.org/web/20130124160823/http://www.minneapolis-concrete.com/how-much-does-concrete-weigh.html>. One page. (Year: 2013).
Lobo et al. Recycled Water in Ready Mixed Concrete Operations. Concrete in Focus, Spring 2003 (2003). 10 pages.
"MB-AETM 90: Air-Entraining Admixture" BASF, Product Data (Apr. 2011), 2 pages, found at http://www.basf-admixtures.com/en/products/airentraining/mbae_90/Pages/default.aspx.
EP14746909.2 Summons to Attend Oral Proceedings dated Jun. 19, 2019.
U.S. Appl. No. 15/304,208 Office Action dated Jan. 24, 2019.

(56) References Cited

OTHER PUBLICATIONS

U.S. Appl. No. 15/170,018 Notice of Allowance dated Dec. 19, 2018.
U.S. Appl. No. 15/240,954 Ex Parte Quayle Office action dated Feb. 5, 2019.
U.S. Appl. No. 15/240,954 Notice of Allowance dated Mar. 5, 2019.
U.S. Appl. No. 15/284,186 Office Action dated Jun. 14, 2019.
U.S. Appl. No. 15/828,240 Office Action dated Jul. 22, 2019.
Google Patents Translation of EP1785245. pp. 1-2. Retrieved Jul. 17, 2019. (Year: 2007).
Tri-Cast literature, Dry cast machine. Besser Company. Sioux, Iowa, USA. (Jun. 2009).
Co-pending U.S. Appl. No. 15/911,573, filed Mar. 5, 2018.
Co-pending U.S. Appl. No. 15/649,339, filed Jul. 13, 2017.
Co-pending U.S. Appl. No. 62/083,784, filed Nov. 24, 2014.
Co-pending U.S. Appl. No. 62/086,024, filed Dec. 1, 2014.
Co-pending U.S. Appl. No. 62/146,103, filed Apr. 10, 2015.
Co-pending U.S. Appl. No. 62/160,350, filed May 12, 2015.
Co-pending U.S. Appl. No. 62/165,670, filed May 22, 2015.
Co-pending U.S. Appl. No. 62/215,481, filed Sep. 8, 2015.
Co-pending U.S. Appl. No. 62/240,843, filed Oct. 13, 2015.
Co-pending U.S. Appl. No. 62/321,013, filed Apr. 11, 2016.
Co-pending U.S. Appl. No. 62/522,510, filed Jun. 20, 2017.
Co-pending U.S. Appl. No. 62/554,830, filed Sep. 6, 2017.
Co-pending U.S. Appl. No. 62/558,173, filed Sep. 13, 2017.
Co-pending U.S. Appl. No. 62/559,771, filed Sep. 18, 2017.
Co-pending U.S. Appl. No. 62/560,311, filed Sep. 19, 2017.
Co-pending U.S. Appl. No. 62/570,452, filed Oct. 10, 2017.
Co-pending U.S. Appl. No. 62/573,109, filed Oct. 16, 2017.
Co-pending U.S. Appl. No. 62/652,385, filed Apr. 4, 2018.
Co-pending U.S. Appl. No. 62/675,615, filed May 23, 2018.
Co-pending U.S. Appl. No. 61/423,354, filed Sep. 15, 2010.
Co-pending U.S. Appl. No. 61/760,319, filed Feb. 4, 2013.
Co-pending U.S. Appl. No. 61/976,360, filed Apr. 7, 2014.
Co-pending U.S. Appl. No. 61/980,505, filed Apr. 16, 2014.
EP15862209.2 Partial Supplementary European Search Report dated Jun. 20, 2018.
European search report dated Nov. 7, 2017 for EP Application No. 15776706.
European search report with written opinion dated Nov. 14, 2017 for EP Application No. 15777459.
European search report with written opinion dated Nov. 29, 2017 for EP15780122.
Le et al. Hardened properties of high-performance printing concrete. Cement and Concrete Research, vol. 42, No. 3, Mar. 31, 2012, pp. 558-566.
Mass. Premixed Cement Paste. Concrete International 11(11):82-85 (Nov. 1, 1989).
Office action dated Oct. 19, 2017 for U.S. Appl. No. 15/228,964.
PCT Application No. PCT/CA2014/050611 as filed Jun. 25, 2014.
Younsi, et al. Performance-based design and carbonation of concrete with high fly ash content. Cement and Concrete Composites, Elsevier Applied Science, Barking, GB, vol. 33, No. 1, Jul. 14, 2011. pp. 993-1000.
Co-pending U.S. Appl. No. 15/650,524, filed Jul. 14, 2017.
Co-pending U.S. Appl. No. 15/659,334, filed Jul. 25, 2017.
European search report with written opinion dated Feb. 2, 2017 for EP2951122.
European search report with written opinion dated Jan. 20, 2017 for EP14818442.
International search report with written opinion dated Jun. 15, 2017 for PCT/CA2017/050445.
International search report with written opinion dated Jul. 3, 2016 for PCT/CA2015/050195.
Notice of allowance dated Apr. 14, 2017 for U.S. Appl. No. 15/157,205.
Notice of allowance dated Apr. 24, 2017 for U.S. Appl. No. 15/161,927.
Notice of allowance dated Jun. 15, 2017 for U.S. Appl. No. 15/157,205.
Notice of allowance dated Jun. 22, 2017 for U.S. Appl. No. 15/161,927.
Notice of allowance dated Jun. 30, 2017 for U.S. Appl. No. 15/434,429.
Notice of allowance dated Jul. 28, 2017 for U.S. Appl. No. 15/434,429.
Notice of allowance dated Aug. 2, 2017 for U.S. Appl. No. 15/161,927.
Office action dated Feb. 27, 2017 for U.S. Appl. No. 14/171,350.
Office action dated Mar. 7, 2017 for U.S. Appl. No. 15/434,429.
Office action dated Mar. 14, 2017 for U.S. Appl. No. 15/228,964.
Office action dated May 10, 2017 for U.S. Appl. No. 13/994,681.
Office action dated Jul. 3, 2017 for U.S. Appl. No. 14/171,350.
Yelton, R. Treating Process Water. The Concrete Producer. pp. 441-443. Jun. 1, 1997.
Co-pending U.S. Appl. No. 15/284,186, filed Oct. 3, 2016.
International Search Report and Written Opinion dated Aug. 30, 2016 for International application No. PCT/CA2016/050773.
International Search Report and Written Opinion dated Oct. 19, 2016 for International Application No. PCT/CA2016/051062.
Kim, et al. Properties of cement-based mortars substituted by carbonated fly ash and carbonated under supercritical conditions. IJAER. 9(24), 25525-25534 (2014).
Notice of Allowance dated Dec. 21, 2016 for U.S. Appl. No. 15/161,927.
Office Action dated Nov. 3, 2016 for U.S. Appl. No. 15/161,927.
Office Action dated Dec. 29, 2016 for U.S. Appl. No. 15/157,205.
Office Action dated Dec. 30, 2016 for U.S. Appl. No. 13/994,681.
Abanades, et al. Conversion limits in the reaction of $CO_2$ with lime. Energy and Fuels. 2003; 17(2):308-315.
Author Unknown, "Splicing Solution," Quarry Management, Oct. 2002, 3 pages.
Bhatia, et al. Effect of the Product Layer on the kinetics of the $CO_2$-lime reaction. AlChE Journal. 1983; 29(1):79-86.
Chang, et al. The experimental investigation of concrete carbonation depth. Cement and Concrete Research. 2006; 36(9):1760-1767.
Chen, et al. On the kinetics of Portland cement hydration in the presence of selected chemical admixtures. Advances in Cement Research. 1993; 5(17):9-13.
"Clear Edge Filtration—Screen and Filter, Process Belts, and Screen Print," Mining-Techology.com, no date, [retrieved on May 25, 2010]. Retrieved from: http://www.mining-technology.com/contractors/filtering/clear-edge/, 2 pages.
Co-pending U.S. Appl. No. 15/170,018, filed Jun. 1, 2016.
Co-pending U.S. Appl. No. 15/184,219, filed Jun. 16, 2016.
Co-pending U.S. Appl. No. 15/228,964, filed Aug. 4, 2016.
Co-pending U.S. Appl. No. 15/240,954, filed Aug. 18, 2016.
Co-pending U.S. Appl. No. 62/096,018, filed Dec. 23, 2014.
Co-pending U.S. Appl. No. 61/839,312, filed Jun. 25, 2013.
Co-pending U.S. Appl. No. 61/847,254, filed Jul. 17, 2013.
Co-pending U.S. Appl. No. 61/879,049, filed Sep. 17, 2013.
Co-pending U.S. Appl. No. 61/925,100, filed Jan. 8, 2014.
Co-pending U.S. Appl. No. 61/938,063, filed Feb. 10, 2014.
Co-pending U.S. Appl. No. 61/941,222, filed Feb. 18, 2014.
Co-pending U.S. Appl. No. 61/992,089, filed May 12, 2014.
Dewaele, et al. Permeability and porosity changes associated with cement grout carbonation. Cement and Concrete Research. 1991; 21(4):441-454.
Dorbian "Nova Scotia-based CArbonCure garners $3.5 min in Series B funds," Reuters PE HUB, Dec. 11, 2013, 6 pages, found at http://www.pehub.com/2013/12/nova-scotia-based-carboncure-garners-3-5-mln-in-series-b-funds/.
Estes-Haselbach. The greenest concrete mixer—carbon sequestration in freshly mixed concrete. Sep. 25, 2012.
Eurpoean search report and search opinion dated Jan. 14, 2015 for EP 11849437.6.
Fernandez-Bertos, et al. A review of accelerated carbonation technology in the treatment of cement-based materials and sequestration of $CO_2$. Journal of Hazardous Materials B112. 2004; 193-205.
Fluid Hole and Size. Newton: Ask a Scientist. Jan. 24, 2005. Retrieved from http://www.newton.dep.anl.gov/askasci/eng99/eng99365.htm on Jul. 13, 2013.
Freedman, S. Carbonation Treatment of Concrete Masonry Units. Modern Concrete. 1969; 33(5):33-6.

(56) References Cited

OTHER PUBLICATIONS

Gager, "Trumbull Corp.: Charleroi Lock & Dam," Construction Today, 2010, [retrieved on May 25, 2010]. Retrieved from http://www.construction-today.com/cms1/content/view/1909/104/, 2 pages.
"Glenium® 3400 NV: High-Range Water-Reducing Admixture," BASF, Product Data, Jun. 2010, 2 pages.
Goodbrake, et al. Reaction of Hydraulic Calcium Silicates with Carbon Dioxide and Water. Journal of the American Ceramic Society. 1979; 62(9-10):488-491.
Goto, et al. Calcium Silicate Carbonation Products. Journal of the American Ceramic Society. 1995; 78(11):2867-2872.
Goto. Some mineralo-chemical problems concerning calcite and aragonite, with special reference to the genesis of aragonite. Contribution from the department of geology and mineralogy. Faculty of Science. Hokkaido University. 1961. http://eprints.lib.hokudai.ac.jp/dspace/bitstream/2115/35923/1/10(4)_571-640.pdf.
Hesson, et al. Flow of two-phase carbon dioxide through orifices. AIChE Journal 4.2 (1958): 207-210.
Huijgen, et al. Mineral CO2 sequestration by steel slag carbonation. Environmental Science and Technology. 2005; 39(24): 9676-9682.
Huntzinger, et al. Carbon dioxide sequestration in cement kiln dust through mineral carbonation. Environ Sci Technol. Mar. 15, 2009;43(6):1986-92.
Hurst. Canadian cement plant becomes first to capture CO2 in algae. Earth and Industry. Pond Biofuels press release. Mar. 19, 2010.
Iizuka, et al. Development of a new CO2 sequestration process utilizing the carbonation of waste cement. Industrial & Engineering Chemistry Research. 2004; (43)24:7880-7887.
International search report and written opinion dated Jan. 25, 2016 for PCT Application No. PCTCA2015/051220.
International search report and written opinion dated Mar. 6, 2012 for PCT Application No. CA2011/050774.
International search report and written opinion dated May 4, 2015 for PCT/CA2015/050118.
International search report and written opinion dated Jul. 16, 2015 for PCT Application No. PCT/CA2015/000158.
International search report and written opinion dated Jul. 16, 2015 for PCT Application No. PCT/CA2015/050318.
International search report and written opinion dated Jul. 18, 2013 for PCT Application No. CA2013/050190.
International search report and written opinion dated Sep. 18, 2014 for PCT/CA2014/050611.
International search report dated May 16, 2014 for PCT Application No. PCT/US14/14447.
Kashef-Haghighi, et al. Accelerated Concrete Carbonation, a CO2 Sequestration Technology. 8th World Congress of Chemical Engineering WCCE8. Aug. 24, 2009.
Kashef-Haghighi, et al. CO2 sequestration in concrete through accelerated carbonation curing in a flow-through reactor. Ind. Eng. Chem. Res. 2010; 49:1143-1149.
Kawashima, et al. Dispersion of CaCO3 Nanoparticles by Sonication and Surfactant Treatment for Application in Fly Ash-Cement Systems. Materials and Structures. May 28, 2013. DOI 10.1617/S11527-013-0110-9.
Lange, et al. Preliminary investigation into the effects of carbonation on cement-solidified hazardous wastes. Environmental Science and Technology. 1996; 30(1):25-30.
Logan, C. Carbon dioxide absorption and durability of carbonation cured cement and concrete compacts. Thesis. Department of Civil Engineering, McGill University. Montreal, QC, Canada. 2006.
Lomboy, et al. Atom Probe Tomography for Nanomodified Portland Cement. Nanotechnology in Construction. Springer International Publishing, 2015. 79-86.
"MB-AETM 90: Air-Entraining Admixture" BASF, Product Data, Apr. 11, 2 pages, found at http://www.basf-admixtures.com/en/products/airentraining/mbae_90/Pages/default.aspx.
Mehta. "Concrete Carbonation". Materials World Magazine. Oct. 1, 2008 [Retrieved on Jul. 13, 2013] Retrieved from http://www.iom3.org/news/concrete-carbonation.
Monkman, et al. Assessing the Carbonation Behavior of Cementitious Materials. J. Mater. Civ. Eng. 2006; 18(6), 768-776.
Monkman, et al. Carbonated Ladle Slag Fines for Carbon Uptake and Sand Substitute. Journal of Materials in Civil Engineering. Nov. 2009;657-665.
Monkman, et al. Carbonation Curing of Slag-Cement Concrete for Binding CO2 and Improving Performance. Journal of Materials in Civil Engineering. Apr. 2010; 296-304.
Monkman, et al. Integration of carbon sequestration into curing process of precast concrete. Can. J. Civ. Eng. 2010; 37:302-310.
Monkman, G. S. Investigating Carbon Dioxide Sequestration in Fresh Ready Mixed Concrete. International Symposium on Environmentally Friendly Concrete—ECO-Crete 13.-15. Aug. 2014, Reykjavik, Iceland.
Monkman, S. Maximizing carbon uptake and performance gain in slag-containing concretes through early carbonation. Thesis. Department of Civil Engineering and Applied Mechanics, McGill University. Montreal, QC, Canada. 2008.
Niven, et al. Carbon Dioxide Uptake Rate and Extent during Accelerated Curing of Concrete. International Congress on the Chemistry of Cement 2007. ICCC 2007.
Niven. Industrial pilot study examining the application of precast concrete carbonation curing. Cardon Sense Solutions Inc. Halifax, Canada. ACEME 2008.
Niven. Physiochemical investigation of CO2 accelerated concrete curing as a greenhosue gas mitigation technology. Theses from the Department of Civil Engineering and Applied Mechanics. McGill University, Montreal, Canada. Oct. 2006.
Notice of allowance dated Feb. 26, 2016 for U.S. Appl. No. 14/642,536.
Notice of allowance dated Mar. 29, 2016 for U.S. Appl. No. 14/701,456.
Notice of allowance dated Apr. 22, 2014 for U.S. Appl. No. 13/660,447.
Notice of allowance dated Apr. 24, 2015 for U.S. Appl. No. 14/249,308.
Notice of allowance dated Apr. 25, 2016 for U.S. Appl. No. 14/642,536.
Notice of allowance dated May 6, 2016 for U.S. Appl. No. 14/796,751.
Notice of allowance dated May 11, 2016 for U.S. Appl. No. 14/701,456.
Notice of allowance dated Jun. 24, 2015 for U.S. Appl. No. 14/249,308.
Notice of allowance dated Jul. 5, 2016 for U.S. Appl. No. 14/282,965.
Notice of allowance dated Aug. 5, 2016 for U.S. Appl. No. 14/796,751.
Notice of allowance dated Aug. 16, 2016 for U.S. Appl. No. 14/796,751.
Notice of allowance dated Sep. 14, 2016 for U.S. Appl. No. 14/796,751.
Notices of allowance dated Mar. 3, 2016 and Mar. 17, 2016 for U.S. Appl. No. 14/701,456.
Office action dated Jan. 25, 2016 for U.S. Appl. No. 14/701,456.
Office action dated Mar. 7, 2016 for U.S. Appl. No. 14/796,751.
Office action dated Mar. 10, 2015 for U.S. Appl. No. 14/249,308.
Office action dated Mar. 28, 2013 for U.S. Appl. No. 13/660,447.
Office action dated Apr. 26, 2016 for U.S. Appl. No. 14/950,288.
Office Action dated Jun. 16, 2016 for U.S. Appl. No. 13/994,681.
Office action dated Jul. 15, 2013 for U.S. Appl. No. 13/660,447.
Office action dated Jul. 30, 2015 for U.S. Appl. No. 14/282,965.
Office action dated Aug. 12, 2016 for U.S. Appl. No. 14/950,288.
Office action dated Aug. 14, 2015 for U.S. Appl. No. 14/701,456.
Office action dated Aug. 18, 2015 for U.S. Appl. No. 14/642,536.
Office action dated Aug. 22, 2016 for U.S. Appl. No. 15/161,927.
Office action dated Sep. 2, 2016 for U.S. Appl. No. 15/228,964.
Office action dated Sep. 28, 2016 for U.S. Appl. No. 15/157,205.
Office action dated Oct. 5, 2015 for U.S. Appl. No. 14/701,456.
Office action dated Dec. 2, 2015 for U.S. Appl. No. 14/282,965.
Office action dated Dec. 7, 2015 for U.S. Appl. No. 14/796,751.
Papadakis, et al. A reaction engineering approach to the problem of concrete carbonation. AIChE Journal. 1989; 35(10):1639-1650.
Papadakis, et al. Fundamental Modeling and Experimental Investigation of Concrete Carbonation. ACI Materials Journal. 1991; 88(4):363-373.

(56) References Cited

OTHER PUBLICATIONS

Phipps and Macdonald. Sustainability Leads to Durability in the New I-35W Bridge. Concrete International. Feb. 2009; vol. 31 Issue 2, p. 27-32.
"Pozzolith® 200N: Water-Reducing Admixture," BASF, Product Data, Sep. 2010, 2 pages, found at http://www.basf-admixtures.com/en/products/waterreducingretarding/pozzolith200n/Pages/default.aspx.
"Pozzolith® 322 N: Water-Reducing Admixture," BASF, Product Data, Mar. 2007, 2 pages.
Preliminary Amendment dated Nov. 1, 2013 for U.S. Appl. No. 13/994,681.
Reardon, et al. High pressure carbonation of cementitious grout. Cement and Concrete Research. 1989; 19(3):385-399.
Sato, et al. Effect of Nano-CaCO3 on Hydration of Cement Containing Supplementary Cementitious Materials. Institute for Research in Construction, National Research Council Canada. Oct. 2010.
Sato, et al. Seeding effect of nano-CaCO3 on the hidration of tricalcium silicate, Transportation Research Record. 2010; 2141:61-67.
Shao, et al. A new CO2 sequestration process via concrete products production. Department of civil engineering. McGill University, Montreal, Canada. 2007.
Shao, et al. CO2 sequestration using calcium-silicate concrete. Canadian Journal of Civil Engineering. 2006;(33)6:776-784.
Shao, et al. Market analysis of CO2 sequestration in concrete building products. Second International Conference on Sustainable Construction Materials and Technologies. Jun. 28-30, 2010.
Shao, et al. Recycling carbon dioxide into concrete: a feasibility study. Concrete Sustainability Conference. 2010.
Shi, et al. Studies on some factors affecting CO2 curing of lightweight concrete products. Resources, Conservation and Recycling. 2008; (52)8-9:1087-1092.
Shideler, J. Investigation of the moisture-vol. stability of concrete masonry units. Portland Cement Association. 1955. (D3).
Shih, et al. Kinetics of the reaction of Ca(OH)2 with CO2 at low temperature. Industrial and Engineering Chemistry Research. 1999; 38(4):1316-1322.
Sorochkin, et al. Study of the possibility of using carbon dioxide for accelerating the hardening of products made from Portland Cement. J. Appl. Chem. USSR. 1975; 48:1271-1274.
Steinour, H. Some effects of carbon dioxide on mortars and concrete-discussion. Journal of the American Concrete Institute. 1959; 30:905-907.
Technology Roadmap: Cement. International Energy Agency. Dec. 2009 [Retrieved on Jul. 13, 2013]. Retrieved from http://www.iea.org/publications/freepublications/publication/name,3861,en.html.
Teir, et al. Carbonation of Finnish magnesium silicates for CO2 sequestration . Fifth Annual Conference on Carbon Capture and Sequestration. May 8-11, 2006. National Energy Technology Laboratory, Department of Energy, USA.
The Vince Hagan Co., "Stationary, Radial Stacking, and Wet Belt Converyors—Product Brochure," 4 pages.
Toennies, et al. Artificial carbonation of concrete masonry units. American Concrete Institute Journal. 1960; 31(8):737-755.
Tri-Cast literature, Besser Company. Sioux, Iowa, USA.
U.S. Appl. No. 13/660,447, filed Oct. 25, 2012.
U.S. Appl. No. 13/994,681, filed Jun. 14, 2013.
U.S. Appl. No. 14/249,308, filed Apr. 9, 2014.
U.S. Appl. No. 14/282,965, filed May 20, 2014.
U.S. Appl. No. 14/642,536, filed Mar. 9, 2015.
U.S. Appl. No. 14/701,456, filed Apr. 30, 2015.
U.S. Appl. No. 14/796,751, filed Jul. 10, 2015.
U.S. Appl. No. 14/950,288, filed Nov. 24, 2015.
U.S. Appl. No. 61/839,312, filed Jun. 25, 2013.
U.S. Appl. No. 61/847,254, filed Jul. 17, 2013.
U.S. Appl. No. 61/879,049, filed Sep. 17, 2013.
U.S. Appl. No. 61/925,100, filed Jan. 8, 2014.
U.S. Appl. No. 61/938,063, filed Feb. 10, 2014.
U.S. Appl. No. 61/941,222, filed Feb. 18, 2014.
U.S. Appl. No. 61/976,360, filed Apr. 7, 2014.
U.S. Appl. No. 61/980,505, filed Apr. 16, 2014.
Van Balen, K. Carbonation reaction of lime, kinetics at ambient temperature. Cement and Concrete Research. 2005; 35(4):647-657.
Venhuis, et al. Vacuum method for carbonation of cementitious wasteforms. Environ Sei Technol. Oct. 15, 2001;35(20):4120-5.
Weber, et al. Find carbon dioxide gas under pressure an efficient curing agent for cast stone. Concrete. Jul. 1941; 33-34.
Young, et al. Accelerated Curing of Compacted Calcium Silicate Mortars on Exposure to CO2. Journal of the American Ceramic Society.. 1974; 57(9):394-397.
Canadian Office Action for Application No. 3,019,860 dated Mar. 2, 2023, 3 pages.
Office Action for Chilean Application No. 03376-2020 dated Nov. 18, 2021, 34 pages.
Ozcan et al., "Process integration of a Ca-looping carbon capture process in a cement plant", International Journal of Greenhouse Gas Control, 2013, vol. 19, pp. 530-540. https://doi.org/10.1016/j.ijggc.2013.10.009).
Republic of Columbia [translation]; First Exam Report for No. NC2021/0009084, dated Aug. 5, 2022, 13 pages.
Shi et al. "Performance Enhancement of Recycled Concrete Aggregate—A Review," Journal of Cleaner Production, 112, pp. 466-472 (2006).
Singapore, Invitation to Respond to Written Opinion for Application No. 11221062015, dated Oct. 18, 2022, 2 pages.
Singapore, Written Opinion for Application No. 1122106201S, dated Oct. 18, 2022, 8 pages.
Summons to Attend Oral Proceedings for EP 15777459.7 mailed Aug. 27, 2021, 7 pages.
Zhan et al. "Carbonation Treatment of Recycled Concrete Aggregate: Effect on Transport Properties and Steel Corrosion of Recycled Aggregate Concrete," Cement and Concrete Composites, 104, pp. 1-8 (Apr. 7, 2019).
Canadian Intellectual Property Office Office Action for CA Application No. 3,068,082, dated Sep. 3, 2024, 7 pages.
Columbian Second Office Action for Application No. NC2021/0009084, dated Apr. 8, 2024, 21 pages.
Dorbian "Nova Scotia-based Carbon Cure garners $3.5 min in Series B funds," Reuters PE HUB, Dec. 11, 2013, 6 pages, found at http://www.pehub.com/2013/12/nova-scotia-based-carboncure-garners-3-5-mln-in-series-b-funds/ (Year: 2013), 6 pages.
Estes-Haselbach. The greenest concrete mixer—carbon sequestration in freshly mixed concrete, Sep. 25, 2012 (Year: 2012), 2 pages.
European Patent Office—Extended European Search Report from Application No. 24156817.9 dated Nov. 12, 2024, 10 pages.
European Patent Office Communication pursuant to Rules 70(2) and 70a(2), from Application No. 21838519.3, dated Jun. 27, 2024, 1 page.
European Patent Office Extended European Search Report and Search Opinion, European Application No. 21822959.9, dated Jun. 10, 2024, 8 pages.
European Patent Office Extended European Search Report for EP Application No. 21885434.7, dated Sep. 20, 2024, 8 pages.
European Patent Office Extended Examination Report for EP 19894565.1, dated Jun. 6, 2024, 9 pages.
European Patent Office Extended Search Report for Application No. EP 11849437.6, dated Jan. 14, 2015, 5 pages.
European Patent Office Partial Search Report for EP Application No. 24156817.9, dated Aug. 8, 2024, pp. 1-12.
European Patent Office Supplemental European Search Report and Rule 70 for Application No. 20794190.7 dated May 4, 2023, 10 pages.
European Patent Office Supplemental European Search Report and Search Opinion (SESR), for Application No. EP 21838519.3, dated Jun. 10, 2024, 6 pages.
European Patent Office Supplemental European Search Report for EP 20874721.2 dated Nov. 6, 2023, 10 pages.
Fernandez-Bertos, et al. A review of accelerated carbonation technology in the treatment of cement-based materials and sequestration of CO2. Journal of Hazardous Materials B112. 2004; (Year: 2004), 13 pages.

(56) References Cited

OTHER PUBLICATIONS

Fluid Hole and Size. Newton: Ask a Scientist. Jan. 24, 2005. Retrieved from http://www.newton.dep.anl.gov/asksci/eng99/eng99365.htm on Jul. 13, 2013 (Year: 2005), 5 pages.
Freedman, S. Carbonation Treatment of Concrete Masonry Units. Modern Concrete. 1969; 33(5):(Year: 1969), 5 pages.
Gager, "Trumbull Corp.: Charleroi Lock & DAM," Construction Today, 2010, [retrieved on May 25, 2010]. Retrieved from http://www.construction-today.com/cms1/content/view/1909/104/, (Year: 2010), 2 pages.
Israeli Patent Office Office Action for Application No. 283905, dated May 28, 2024, 6 pages.
Japanese Patent Office Office Action for Application No. 2020-551893, dated Sep. 26, 2023, [Translation], 20 pages.
Japanese Patent Office, Office Action regarding Patent Application No. 2020-551893, Jun. 25, 2024 (Translation), 15 pages.
Japanese Patent Office, Reasons for Rejection for Application No. JP 2022521047, dated Nov. 12, 2024, 9 pages.
Kaliyavaradhan Senthil Kumar et al: "Valorization of waste powders from cement-concrete life cycle: A pathway to circular future", Journal of Cleaner Production, Elsevier, Amsterdam, NL, vol. 268, May 22, 2020, 25 pages.
Malaysian Patent Office, Substantive Examination and Search Report, Application No. PI2021003227, dated Mar. 13, 2024, 3 pages.
Mexican Patent Office First Office Action for Patent Application No. MX/a/2021/006988, dated Jul. 16, 2024, [Translation], 7 pages.
Mexican Patent Office Office Action for Application No. MX/a/2024/000011, dated Jan. 25, 2024, 24 pages.
Mexican Patent Office, Office Action for Application No. MX/a/2018/012464, dated Jul. 20, 2023, 8 pages.
Monkman et al., The Durability of Concrete Produced Using CO2 as an Admixture, date: Aug. 2016, Fourth 1-3 International Conference on Sustainable Construction Materials and Technologies, Las Vegas, USA, Retrieved from the internet: URL:https: 1/www.researchgate.net/publication/343117870, 14 pages.
Saudi Authority for Intellectual Property Office, First Examination Report, Application No. 522432205, dated Jul. 25, 2024, 12 pages.
Singapore Patent Office Examination Report for SG11202203433R, dated Jun. 7, 2023, 5 pages.
Singapore Patent Office Search Report for Application No. SG11202203433R, dated May 15, 2023, 2 pages.
Singapore Patent Office Substantive Examination and Written Opinion, Patent Application No. 10202010009X, dated Aug. 22, 2024, 8 pages.
UAE Patent Office—English Translation of First Office Action Summary and Search Report for UAE Application No. P600061812022, dated Oct. 4, 2024, 9 pages.
United States International Search Report and Written Opinion for PCT/US23/029354, dated Feb. 1, 2024, 25 pages.
Vietnam Patent Office Substantive Examination for Application No. 1-2021-03941 dated Oct. 18, 2023, 3 pages.
Zhang et al. "Influence of carbonated recycled concrete aggregate on properties of cement mortar," ScienceDirect Construction and Building Materials 98 (2015); http://dx.doi.org/10.1016/j.conbuildmat.2015.08.087, 7 pages.
Zhang et al. "Performance Enhancement of Recycled Concrete Aggregates through Carbonation," ResearchGate Journal of Materials in Civil Engineering • Mar. 2015, 8 pages.
Australia Patent Office Examination Report No. 1 dated Dec. 13, 2024 for Application No. 2019397557, 4 pages.
Canadian Intellectual Property Office Examination Report for CA Application No. 3,225,611 dated Feb. 6, 2025, 4 pages.
Canadian Intellectual Property Office, Canadian Office Action, CA Application No. 3,212,028, dated Jan. 30, 2025, 3 pages.
Mexican Patent Office Second Office Action for MX Application No. MX/a/2021/006988 dated Jan. 29, 2025, 11 pages.
Saudi Arabia Intellectual Property Office 2nd Substantive Examination Report from Application No. 522432205, dated Feb. 18, 2025, 14 pages.
US Patent Office Restriction Requirement for U.S. Appl. No. 18/979,708 dated Mar. 6, 2025, 10 pages.
Canadian Patent Office, Canadian Examiner's Report, Canadian Application No. 3,122,573, dated May 26, 2025, 7 pages.
European Patent Office, European Office Action, European Application No. 21822959.9, dated Apr. 25, 2025, 5 pages.
European Patent Office Extended Search Report for EP Application No. 24212047.5, dated Apr. 23, 2025, 11 pages.
International Searching Authority, International Search Report from PCT Application No. PCT/US25/14881, dated May 23, 2025, 11 pages.
Japanese Patent Office, Reasons for Rejection for JP Application No. 2022-521047, dated Mar. 25, 2025, 9 pages.
Korean Patent Office Office Action for KR Application No. 10-2021-7021868, dated Mar. 18, 2025, 22 pages.
Pei, Junjie et al, Use of carbonated Portland cement clinkers as a reactive or non-reactive aggregate for the production of cement mortar, dated 2022, pp. 1-9.
UAE Patent Office, English Translation of Office Action Summary and Search Report from UAE Application No. P6000969/2021, dated Mar. 16, 2025, 8 pages.
Yang et al, Influence of dry ice on the performance of Portland cement and its mechanism, dated Aug. 17, 2018, pp. 1-7, School of Materials Science and Engineering, Henan Polytechnic University, Jiaozuo, Henan 454003, PR China.
Canadian Intellectual Property Office Office Action for CA Application No. 3,138,622, dated Aug. 5, 2025, 4 pages.
European Patent Office Examination Report for Application No. 19894565.1 dated Sep. 11, 2025, 7 pages.
Mexican Patent Office Third Office Action for MX Application No. MX/a/2021/006988 dated Jul. 21, 2025, 19 pages.

\* cited by examiner

METHODS AND COMPOSITIONS FOR DELIVERY OF CARBON DIOXIDE

CROSS-REFERENCE

This application is related to U.S. patent application Ser. No. 15/650,524, filed Jul. 14, 2017, and to U.S. patent application Ser. No. 15/659,334, filed Jul. 25, 2017, both of which are incorporated herein by reference. This application claims priority to U.S. Provisional Patent Application No. 62/705,130, filed Jun. 12, 2020, which is incorporated by reference herein in its entirety.

BACKGROUND OF THE INVENTION

The use of snow horns to produce a mixture of gaseous and solid carbon dioxide from liquid carbon dioxide is well known. A snow horn is typically used to deliver a relatively large dose of carbon dioxide as solid carbon dioxide, and it is generally not necessary or possible to achieve a precise or reproducible dose of carbon dioxide from the snow horn, in a desired ratio of solid to gaseous carbon dioxide, especially at low doses and/or under intermittent conditions.

SUMMARY OF THE INVENTION

In certain embodiments, provided herein is an apparatus comprising (i) one or more receiving units for receiving input from a carbon dioxide injection system; (ii) one or more receiving units for receiving input from a concrete production facility batch control system; (iii) a processing unit for processing the input received from (i) and/or (ii) and for providing one or more outputs based on said processing; (iv) one or more signal units for producing one or more signals from one or more outputs from the processing unit to be transmitted to the carbon dioxide injection system; and (v) one or more signal units for producing one or more signals from one or more outputs from the processing unit to be transmitted to the batch control system. In certain embodiments the apparatus further comprises a housing enclosing the receiving units, the processing unit, and the signal production units. In certain embodiments the receiving units comprise a wireless input. In certain embodiments the signal production units comprise a wireless output. In certain embodiments, the receiving units comprise a port for a wired connector. In certain embodiments the signal production units comprise a port for a wired connector. In certain embodiments the apparatus further comprises a transmission unit, e.g., a telemetry unit operably connected to the processor for sending information from the processor to a remote location. In certain embodiments the remote location is at least 1, 2, 5, 10, 20, 50, 100, 150, 200, 500 miles from the processor. In certain embodiments the processor comprises a printed circuit board (PCB). In certain embodiments the processor comprises a programmable logic controller (PLC). In certain embodiments the apparatus further comprises a human machine interface (HMI).

In certain embodiments, provided herein is a carbon dioxide injection apparatus comprising (i) a first carbon dioxide injection orifice configured to convert liquid carbon dioxide supplied on a proximal side of the orifice to solid and gaseous carbon dioxide emitted on a distal side of the orifice; (ii) an internal liquid carbon dioxide input conduit operably connected to the first injection orifice at a distal end and to a connector for an external liquid carbon dioxide input conduit at a proximal end; (iii) a valve situated proximal to the first injection orifice in the internal liquid carbon dioxide input conduit for initiating and stopping carbon dioxide flow to the first injection orifice; (iv) a first pressure sensor in the internal liquid carbon dioxide input conduit situated between the valve and the first injection orifice, wherein the first pressure sensor produces a first signal to be transmitted to a first receiver for the first signal; (viii) a first temperature sensor in the internal liquid carbon dioxide input conduit situated between the valve and the first injection orifice, wherein the first temperature sensor produces a second signal to be transmitted to a second receiver for the second signal. In certain embodiments the apparatus further comprises a second pressure sensor located distal to the first injection orifice, wherein the second pressure sensor produces a third signal to be transmitted to a third receiver for the third signal. In certain embodiments the apparatus comprises a third pressure sensor located proximal to the valve in the internal liquid carbon dioxide conduit wherein the third pressure sensor produces a fourth signal to be transmitted to a fourth receiver for the fourth signal. In certain embodiments the apparatus further comprises a second temperature sensor located distal to the first injection orifice wherein the second temperature sensor produces a fifth signal to be transmitted to a fifth receiver for the fifth signal. In certain embodiments the apparatus further comprises (iii) a first internal carbon dioxide output conduit for solid and gaseous carbon dioxide leading from and operably connected to the first injection orifice at a proximal end and to a connector for an external carbon dioxide output conduit at a distal end. In certain embodiments the apparatus further comprises a housing enclosing the first injection orifice, the first pressure sensor, the first temperature sensor, the liquid carbon dioxide input conduit, and the valve. In certain embodiments the apparatus further comprises an internal gas carbon dioxide input conduit, operably connected at its distal end to the internal liquid carbon dioxide input conduit between the valve and the first injection orifice and operably connected at its proximal to a connector for an external gaseous carbon dioxide input conduit. In certain embodiments the apparatus further comprises a visual pressure gauge and a safety relief operably connected to the internal liquid carbon dioxide input conduit proximal to the first injection orifice, and a filter in the internal liquid carbon dioxide input conduit proximal to the first injection orifice. In certain embodiments the apparatus further comprises a second injection orifice operably connected to the internal liquid carbon dioxide input conduit. In certain embodiments the apparatus further comprises a heating unit to supply heat to the first injection orifice and to a portion of the internal carbon dioxide conduit comprising a portion between the valve and the injection orifice. In certain embodiments the apparatus further comprises a heat sink operably connected to the heating unit. In certain embodiments the apparatus further comprises an intermediate processing unit connected to the carbon dioxide injection apparatus, wherein the intermediate processing unit comprises the first and second receivers.

In certain embodiments provided herein is a kit for retrofitting a ready-mix or precast concrete operation to supply gaseous and solid carbon dioxide to concrete in the operation, wherein the operation mixes concrete in a mixer, comprising (i) a first conduit configured on a proximal end for connection to a liquid portion of a liquid carbon dioxide container and on its distal end for connection to a carbon dioxide injector unit; (ii) the carbon dioxide injector unit, comprising (a) a first carbon dioxide injection orifice, (b) an internal liquid carbon dioxide input conduit operably connected at a distal end to the first carbon dioxide injection orifice and at its proximal end to a connector for the first conduit, wherein the internal liquid carbon dioxide input conduit comprises a valve proximal to the first carbon dioxide injection orifice, (c) a connector, distal to the first carbon dioxide injection orifice, for connecting to a second conduit, (d) a first pressure sensor for producing a first signal to be transmitted to a first receiver, and (e) a first temperature sensor for producing a second signal to be transmitted to a second receiver; (iii) the second conduit, configured on a proximal end to connect with the connector of (ii)(c) and configured on a distal end to connect with a third conduit; (iv) the third conduit, configured on its proximal end to connect with the second conduit; and (v) an intermediate processing unit, comprising (a) the first receiver, (b) the second receiver, (c) a processing system operably connected to the first and second receivers, wherein the processing system is configured to process the first and second signals and to produce a first output signal and a second output signal, the first and second output signals based, at least in part, on said processing, wherein the intermediate processing unit is configured to transmit the first output signal to a third receiver in the injector unit and to transmit the second output signal to a batch control system of the ready-mix or precast concrete operation. In certain embodiments the concrete operation is a wet-mix ready-mix operation or a precast operation, wherein concrete is mixed in a stationary mixer, and the third conduit comprises a connector on a distal end for connecting to the stationary mixer. In certain embodiments the kit further comprises instructions for assembly of the kit and integration with the concrete operation, wherein the instructions are written, electronic, or a combination thereof. In certain embodiments the concrete operation is a dry mix concrete operation wherein concrete materials are mixed in a ready-mix truck drum, and the kit further comprises a fourth conduit configured at a proximal end to connect with the third conduit and open at a distal end. In certain embodiments the kit further comprises fittings for the first, second, and third conduits. In certain embodiments the kit further comprises fittings for the fourth conduit. In certain embodiments the kit further comprises a fifth conduit configured on a proximal end for connection to a gas portion of a liquid carbon dioxide container and on its distal end for connection to the carbon dioxide injector unit, wherein the carbon dioxide injector unit further comprises an internal gas carbon dioxide input conduit operably connected at its distal end to the internal liquid carbon dioxide input conduit between the valve and the first injection orifice and operably connected at its proximal to a connector for connecting to the fifth conduit. In certain embodiments the carbon dioxide injector unit further comprising a second carbon dioxide injection orifice; a connector, distal to the second carbon dioxide injection orifice for a sixth conduit; and the sixth conduit. In certain embodiments the kit further comprises a carbon dioxide sensor for producing a third signal to be transmitted to a third receiver. In certain embodiments the third receiver is contained in the intermediate processing unit.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
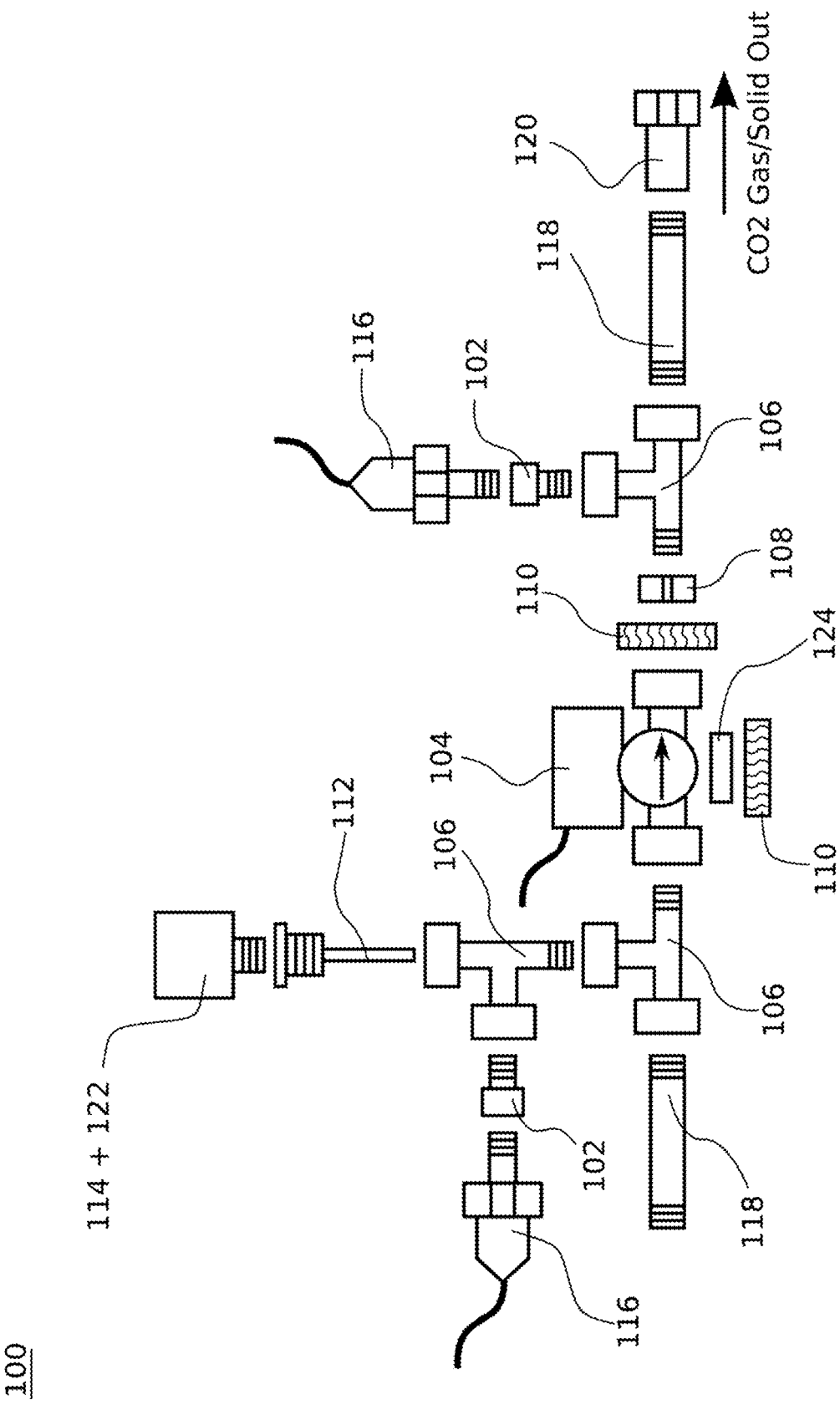
FIG. 1 shows a direct injection assembly for carbon dioxide that does not require a gas line to keep the assembly free of dry ice between runs.

The methods and compositions of the present invention provide reproducible dosing of solid and gaseous carbon dioxide, under intermittent conditions and at low doses and short delivery times, without using apparatus and methods that lead to significant loss of carbon dioxide in the process.

Methods and apparatus as provided herein can allow very precise dosing, e.g., dosing with a coefficient of variation (CV) over repeated doses of less than 10%, less than 8%, less than 6%, less than 5%, less than 4%, less that 3%, less than 2%, or less than 1%; for example, when dosing repeated batches of less than, e.g., 200, 150, 100, 90, 80, 70, 60, 50, 40, 30, 20, or 10 pounds of carbon dioxide per batch, where the carbon dioxide is delivered as a liquid in a first conduit of the system, and exits through an orifice into a second conduit of the system, where it flows as a mixture of solid and gaseous carbon dioxide to a destination In particular, the methods and compositions of the invention are useful when doses of carbon dioxide are low and injection times are short, but it is desired to deliver a mixture of solid and gaseous carbon dioxide with a high solid/gas ratio, even if there is a significant pause between runs and even at relatively high ambient temperatures. For example, the methods and compositions of the invention can be used to deliver a dose of carbon dioxide of at least 5, 10, 15, 20, 25, 30, 35, 40, 45, 50, 60, 70, 80, 90, 100, or 120 pounds and/or not more than 10, 15, 20, 25, 30, 35, 40, 45, 50, 60, 70, 80, 90, 100, or 120, such as 5-120 pounds, or 5-90 pounds, or 5-60 pounds, or 5-40 pounds, or 10-120 pounds, or 10-90 pounds, or 10-60 pounds, or 10-40 pounds, in an intermittent fashion where the average time between doses is at least 2, 3, 4, 5, 6, 7, 8, 9, 10, 12, 15, 20, 25, 30, 40, 50, 60, 80, 100, or 120 minutes, where the delivery time for the dose is less than 180, 150, 120, 100, 90, 80, 70, 60, 55, 50, 45, 40, 35, 30, 25, 20, 15, or 10 seconds.

The ratio of solid/gaseous carbon dioxide delivered to the target may be at least 0.3, 0.32, 0.34, 0.36, 0.38, 0.40, 0.41, 0.42, 0.43, 0.44, 0.45, 0.46, 0.47, 0.48, or 0.49. The reproducibility of doses between runs may be such that the coefficient of variation (CV) is less than 20, 15, 12, 10, 9, 8, 7, 6, 5, 4, 3, 2, or 1%. These values can hold even at relatively high ambient temperatures, such as average temperatures above 10, 15, 20, 21, 22, 23, 24, 25, 26, 27, 28, 29, 30, 31, 32, 33, 34, 35, 36, 37, 38, 39, or 40° C.

For example, using the methods and compositions of the invention, it is possible to deliver intermittent doses of carbon dioxide of 5-60 pounds, at an average solid/gas ratio of at least 0.4, with a delivery time of less than 60 seconds and at least 2, 4, 5, 7, or 10 minutes between runs, where the ambient temperature is at least 25° C., with a CV of less than 10%, or even with a CV of less than 5%, 4%, 3%, 2%, or 1%. Such short delivery times, high solid/gas ratios, and high reproducibility, achieved during intermittent low doses, are not possible with current apparatus without a significant waste of carbon dioxide, e.g., by continuously venting gaseous carbon dioxide formed between runs from the line. Methods and systems provided herein can allow accurate, precise and reproducible dosing of low doses of carbon dioxide, e.g. as described above, with liquid carbon dioxide being converted to a mixture of solid and gaseous carbon dioxide, without venting of gaseous carbon dioxide in the line that carries the liquid carbon dioxide.

In current conventional set-ups, in which carbon dioxide is converted to solid and gas, a source of liquid carbon dioxide is connected to an orifice via a conduit, where the orifice is open to the atmosphere. Generally, beyond the orifice the conduit expands for a relatively short distance, such as one to four feet, to direct the combination of solid and gaseous carbon dioxide to a desired destination. In a typical current operation, the conduit leading from the source of liquid carbon dioxide to the orifice is well insulated; nonetheless, in intermittent operations, the conduit will warm to some degree, depending on ambient temperature and time between uses. If the time between uses is long enough, it may warm sufficiently that when a new burst of liquid carbon dioxide is released into the conduit, carbon dioxide in the conduit has been converted to gas between runs and some of the carbon dioxide released into the conduit will be converted to gaseous carbon dioxide, and often the first carbon dioxide exiting the orifice is just gaseous carbon dioxide. This continues until the liquid carbon dioxide cools the conduit to a sufficiently low temperature that it is maintained in liquid form from its source to the orifice, and at this point the desired mixture of solid and gaseous carbon dioxide is delivered. However, the first portion of carbon dioxide will be entirely or almost entirely gaseous carbon dioxide and will be relatively large since the length of the conduit extends from the source of carbon dioxide to the point of use. For use in, e.g., food manufacturing and other such processes, this initial burst of gaseous carbon dioxide is not a problem, since precise dosage of a solid/gas mix is not required and since applications are done at intervals that allow little time for equilibration of the conduit with the outside temperature.

However, there are applications for which a precise dose of carbon dioxide, delivered in a desired ratio of solid to gaseous carbon dioxide, at low doses and in an intermittent manner, is desired. This requires that the carbon dioxide from the source reaching the orifice be maintained in liquid form with a sufficiently small amount of gas formed that it does not significantly impact the dosing. It is possible to do this through cumbersome apparatus such as liquid-gas separators in the line, or a countercurrent mechanism in the snow horn itself to maintain the carbon dioxide in liquid form before it reaches the orifice (see, e.g., U.S. Pat. No. 3,667, 242). However, such methods require venting of gas or reliquefication, both of which are wasteful, inefficient, and expensive to implement. It is especially wasteful when the distance from the source of carbon dioxide to the orifice, which is generally placed near the desired target for the snow produced by the snow horn, is long, as this provides ample opportunity for the liquid carbon dioxide to convert to gas. There are many applications where the configuration of various apparatus at the site do not allow a short distance between the source of liquid carbon dioxide, e.g., a tank of liquid carbon dioxide, and the final destination for the carbon dioxide. For example, in a concrete operation, such as a ready-mix concrete operation or a precast operation, if it is desired to deliver a dose of carbon dioxide to concrete mixing in a mixer, the liquid carbon dioxide tank often must be positioned at a distance from the delivery point, e.g., often 50 or more feet from the delivery point.

Provided herein are methods and compositions that 1) allow transfer of liquid carbon dioxide from a source, such as a tank, to an orifice where it is converted to solid and gaseous carbon dioxide, while maximizing the percentage of carbon dioxide reaching the orifice that is liquid, without having to vent carbon dioxide or use an insulated line; 2) maximize the amount of carbon dioxide that remains solid as it travels from the orifice to its point of use; and 3) allows for repeatable, reproducible dosing under a variety of ambient conditions and at low doses of carbon dioxide.

In the methods and compositions provided herein, a first conduit, also referred to herein as a transfer conduit or transfer line, carries liquid carbon dioxide from a holding tank to an orifice open to atmospheric or near-atmospheric pressure, configured to convert the liquid carbon dioxide to solid and gaseous carbon dioxide. The first conduit is configured to minimize the amount of gaseous carbon dioxide produced initially in a run, and during the course of the run. Thus, the length of the first conduit from the source of liquid carbon dioxide to the orifice that produces the mixture of solid and gaseous carbon dioxide is kept short, preferably as short as possible and/or to a set, calibrated length, and the diameter is kept to a value that allows for a small total volume in the first conduit without being so narrow as to induce a pressure drop sufficient to cause conversion of liquid to gaseous carbon dioxide within the conduit. The first conduit is generally not insulated, and is made of material, such as braided stainless steel, that can withstand the temperature and pressure of the liquid carbon dioxide. Since the length is short, the total heat capacity of the first conduit is low, and the conduit rapidly equilibrates with the temperature of liquid carbon dioxide as it initially enters the conduit. It will be appreciated that at very low ambient temperatures, i.e., ambient temperatures below the temperature of the carbon dioxide in the storage tank (which can vary depending on the pressure in the tank), the conduit will be at a low enough temperature that virtually no liquid carbon dioxide will convert to gas at the start of the run, but at ambient temperatures above that at which the carbon dioxide will remain liquid in the conduit, there inevitably is some gas formation; how much gas is formed depends on the temperature which the conduit has reached between runs and the heat capacity of the conduit. However, even if the ambient temperature is relatively high (e.g., above 30° C.) and the time between runs is sufficient for the conduit to equilibrate with ambient temperature, only a very short time is required to cool the conduit to the temperature of liquid carbon dioxide flowing through, for example, less than 10, 8, 7, 6, 5, 4, 3, 2, or 1 second. As liquid carbon dioxide flows through the conduit, further heat will be lost through the wall of the conduit to the outside air (assuming an ambient temperature above that of the liquid carbon dioxide) during the time of the flow, but since the diameter and length of the conduit are kept low, flow is rapid and relatively little heat is lost as carbon dioxide flows to the orifice. Thus, within a few seconds, e.g., within 10 seconds, or within 8 seconds, or within 5 seconds, a large proportion of the carbon dioxide remains as liquid as it reaches the orifice, such as at least 80, 90, 92, 95, 96, 97, 98, or 99%. Because the ratio of solid to gaseous carbon dioxide exiting the orifice is related, at least in part, to the proportion of carbon dioxide that is liquid as it reaches the orifice, within seconds a ratio approaching 1:1 solid: gas (by weight) may be reached.

The first conduit may be of any suitable length, but must be short enough that a significant amount of gas will no accumulate in the conduit (and require removal before liquid carbon dioxide can reach the orifice). Thus, the first conduit can have a length of less than 30, 25, 20, 17, 15, 14, 13, 12, 11, 10, 9, 8, 7, 6, 5, 4, 3, 2, 1, 0.5, or 0.25 feet, and/or not more than 25, 20, 17, 15, 14, 13, 12, 11, 10, 9, 8, 7, 6, 5, 4, 3, 2, 1, 0.5, 0.25, 0.1, or 0.01 feet, such as 0.1-25 feet, or 0.1-15 feet, or 0.1-10 feet, or 1-15 feet. Different systems, e.g., systems provided to different customers, may all contain the same length, diameter, and/or material of first conduit, e.g. a conduit of 10-foot length, or any other suitable length, so that calibration curves made using the same length and type of conduit can be applied to different systems.

The inner diameter (I.D.) of the first conduit may be any suitable diameter; in general, a smaller diameter is preferred, to decrease mass and travel time to the orifice, but the diameter cannot be so small that it causes a sufficient pressure drop over the length of the conduit to cause liquid carbon dioxide to convert to gas. The I.D. of the first conduit thus may be at least 0.1, 0.2, 0.3, 0.4, 0.5, 0.6, 0.7, 0.8, 0.9, or 1.0 inch, and not more than 0.2, 0.3, 0.4, 0.5, 0.6, 0.7, 0.8, 0.9, 1.0, 1.5, or 2 inch, such as 0.1-0.8, or 0.1-0.6, or 0.2-0.7, or 0.2-0.6, or 0.2-0.5 inch, for example, about 0.25 inch, or 0.30 inch, or 0.375 inch, or 0.5 inch. The first conduit delivering the carbon dioxide to the orifice need not be highly insulated, and in fact can be made of material with high thermal conductivity, e.g., a metal conduit with thin walls. For example, a braided stainless steel line, such as would be found inside a vacuum jacket line (but without the vacuum jacket) may be used. The conduit may be rigid or flexible. Because the conduit is short and small diameter, it has a low heat capacity, and thus, as liquid carbon dioxide is released into the conduit, it is cooled to the temperature of the liquid carbon dioxide very quickly, and the liquid carbon dioxide also passes its length quickly, so that there is only a short lag time from the start of carbon dioxide delivery to the time when carbon dioxide delivered to the orifice is substantially all liquid carbon dioxide, or at least 80, 85, 90, 95, 96, 97, 98, or 99% liquid carbon dioxide. The lag time may be less than 20, 15, 10, 9, 8, 7, 6, 5, 4, 3, 2, or 1 second. The lag time will depend on ambient temperature and the time between runs; at low ambient temperature and/or short time between runs, very little or no time will be needed to bring the first conduit to the temperature of the liquid carbon dioxide. At low enough ambient temperature, i.e., at or below the temperature of liquid carbon dioxide at the pressure being used, virtually no time is needed to equilibrate the first conduit, as it is already at a temperature that will not produce any gaseous carbon dioxide as the liquid carbon dioxide passes through. An exemplary conduit is ⅜ in×120 in OA 321SS Braided hose C/W St. steel MnPt Attd each end.

Typically, the first conduit will contain a valve for initiating and stopping carbon dioxide flow to the orifice, with the valve being situated near the orifice. The section of conduit between the valve and the orifice, and/or conduit situated after the orifice, can be subject to icing between runs. In certain embodiments, a separate gas conduit is run from the carbon dioxide source to the section of the first conduit between the valve and the orifice, and carbon dioxide gas is sent through this section and the orifice to remove residual liquid carbon dioxide between runs.

In alternative embodiments, no gas conduit is required. In these embodiments, a heat source is situated such that the section of conduit between the valve and the orifice, the orifice itself, and/or a section of conduit after the orifice, may be heated sufficiently between runs that any liquid or solid in these sections and/or the orifice is converted to gas (this would generally only be required when the solenoid is closed and the pressure drops, thereby causing the carbon dioxide to drop to the gas/solid phase portion of the phase diagram, resulting in some gas and solid snow which needs to be converted to gas by introducing heat before the next cycle). In addition, enough suitable material may be included with the heat source so that a heat sink of sufficient capacity to sublime any dry ice formed between the valve and orifice between cycles is created. When liquid carbon dioxide is run through the valve the valve temperature approaches the equilibrium temperature of the liquid; closing the valve effectively results in the liquid trapped between the solenoid and orifice turning to gas and dry ice in an approximately 1:1 ratio with the dry ice at, e.g., −78.5° C. This causes some more cooling of the valve, but to work there has to be enough mass in the heat sink to take this cooling and still have capacity to sublime the dry ice, which has an enthalpy of sublimation of 571 kJ/kg (25.2 kJ/mole) before reaching −78.5° C. An exemplary heat sink may be built with a finned design and comprise any suitable material, e.g., aluminum. The fins assist the heat sink to gain heat from the surroundings quickly and aluminum can be used due to its rapid heat conduction properties, allowing heat to quickly move to the valve and sublime the dry ice. In certain embodiments, induction heating may be used. This design allows cycles in short intervals, e.g., a minimum interval of 10, 8, 7, 6, 5, 4, 3, 2, or 1 min, for example, a minimum interval time of about 5 minutes.

Heating bands may be used in colder areas and to give some redundancy, such as band claim heaters, e.g., a first band claim heater wrapped around the heat sink that is under the liquid valve and a second band claim heater wrapped around the orifice. In certain embodiments, one or more induction heaters may be used. In certain embodiments, one or more (e.g., 2) redundant pressure sensors may be included, e.g., so that if one fails the other can start reading.

In these embodiments, the need for the gas line is obviated, reducing the materials in the system. In addition, because a source of gaseous carbon dioxide is not required in addition to a source of liquid carbon dioxide, the system may be run with smaller tanks that are not configured to draw off gaseous carbon dioxide, such as mizer tanks or even portable dewars which are not designed to output very high gas flow rates, e.g., soda fountain tanks. These are readily available for immediate installation in such facilities, thus eliminating the need to commission custom tanks that are small enough for the operation being fitted, but also fitted with a gas line.

An example of a system that does not require a separate gas line is shown in FIG. 1. The CO2 piping assembly 100 includes fitting 102 (e.g., ½ inch MNPT to ¼ inch FNPT), valve 104 (e.g. ½ inch FNPT Stainless Steel Solenoid Valve, cryo liquid rated), fitting 106 (e.g. ½ inch MNPT×½ inch 2FNPT Tee), nozzle 108 (e.g. stainless steel orifice), heater 110, fitting 112 (e.g ½ inch MNPT Thermowell), probe 114 (e.g. ½ inch MNPT temperature probe), transmitter 116 (e.g., ¼ inch MNPT pressure sensor and transmitter), fitting 118 (e.g. ½ inch MNPT×4 inch nipple), fitting 120 (e.g. ½ inch FNPT×¾ inch FNPT), transmitter 122 (e.g., temperature transmitter, which can allow the probe to read temperatures below 0° C.), and heat sink 124.

The apparatus may contain a variety of sensors, which can include pressure and/or temperature sensors. For example, there may be a first pressure sensor prior to the valve, which indicates tank pressure, a second pressure sensor after the valve but before the orifice, and/or a third pressure sensor just after the orifice. One or more temperature sensors may be used, e.g., after the valve but before the orifice, and/or after the orifice. Feedback from one or more of these sensors may be used to, e.g., determine the flow rate of carbon dioxide. Flow rate may be determined through calculation using one or more of the pressure or temperature values. See, e.g., U.S. Pat. No. 9,758,437.

Additionally or alternatively, flow rate may be determined by comparison to calibration curves, where such curves can be obtained by measuring flow, by, e.g., measuring change in weight of a liquid carbon dioxide tank, or any other suitable method, using a conduit and orifice that are similar to or identical to those used in the operation, at various ambient temperatures and tank pressures. In either case, measurements of the appropriate pressure and/or temperature in the system may be taken at intervals, such as at least every 0.01, 0.1, 0.2, 0.3, 0.4, 0.5, 0.6, 0.7, 0.8, 0.9, 1, 1.5, 2, 3, 4, or 5 seconds and/or not more than every 0.1, 0.2, 0.3, 0.4, 0.5, 0.6, 0.7, 0.8, 0.9, 1, 1.5, 2, 3, 4, 5, or 6 seconds. The control system may also calculate an amount of carbon dioxide delivered, based on flow rate and time. In certain embodiments, such as for a concrete operation, the control system may be configured to send a signal to a central controller for the concrete operation each time a certain amount of carbon dioxide has flowed through the system; the central controller may be configured to, e.g., count the signals and stop the flow of carbon dioxide after a predetermined number of signals, corresponding to the desired dose of carbon dioxide, have been received. This is similar to the manner in which such controllers can regulate the amount of admixture added to a concrete mix. In some systems the admixture is pore weighted, in which case the system simulates batching up to a given weight by mimicking a load cell out put, then when signaled to drop the carbon dioxide into the mixer, the system counts backwards from the target dosage using the actual discharge carbon dioxide. This involves receiving a signal and providing a feedback voltage based on the weight in the simulated (ghost) scale.

Alternatively, temperatures and pressures of the system may be matched to one or more appropriate calibration curves, or an array of curves which are interpolated to develop an injection equation, and, for a given dose, the time to deliver that dose is based on the appropriate injection equation or equations. The control system may shut off carbon dioxide flow after the appropriate time has elapsed. The calibration curve being used at any given time may vary depending on temperature and/or pressure readings for that time.

In certain embodiments, a temperature sensor is used that gives instantaneous or nearly instantaneous feedback of liquid carbon dioxide temperature and allows for increased accuracy when metering. It can also quickly detect when only gas is flowing through the system or if the tank is close to empty. Without being bound by theory, it is thought that after the orifice snow formation is occurring at temperatures less than −70° C. and the area of solid formation starts to impact the temperature of the liquid before the orifice, thus increasing the flow rate. This temperature sensor flow model can also indicate when a storage tank is out of equilibrium (e.g., after tank fill, when ambient temperatures are less than the liquid temperature, when the pressure builder on the tank is turned off, etc.). This model may allow for very low CVs, e.g., less than 5%, or less than 3%, or less than 2%, or less than 1%. This model allows removal of assumptions of the carbon dioxide tank and the equilibrium between the pressure and temperature of the liquid carbon dioxide. This model reads the pressure of the tank at the beginning of injection and calculates the expected temperature of the liquid carbon dioxide based on a boiling curve equation derived from the carbon dioxide phase diagram. The system also takes an initial temperature reading and calculates the transition time which is the time from liquid valve open to flow liquid flow. During the transition time it is expected that a mixture of gas and liquid carbon dioxide and a gas/liquid flow equation is used; afterwards a liquid flow equation is used to calculate the flow of carbon dioxide. The model uses a linear equation derived from multiple injections (e.g., over 10, 100, 500, or over 1000 injections) across a range of tank pressures and is dependent on upstream pressure. The model also has a pressure multiplier where it calculates the drop-in pressure from the inlet liquid pressure sensor to the upstream pressure sensor and modifies the flow as the difference between these two sensors deviates. If there is any obstruction in the piping of the system, the multiplier will adjust the flow accordingly. The temperature multiplier reads the temperature sensor and compared to the calculated liquid carbon dioxide temperature. As the sensor reads temperatures lower than the calculated value, or higher, the temperature multiplier modifies the flow accordingly. Existing systems may have new pressure sensors, taller valve enclosure for quick and easy repairs, and to increase durability a new check and hydraulic fitting stand on the downstream pressure sensor to remove the sensor from the cold region of snow formation after the orifice. The hydraulic stand has proved to reduce the rate of failed downstream pressure sensors significantly.

Figure 2A:
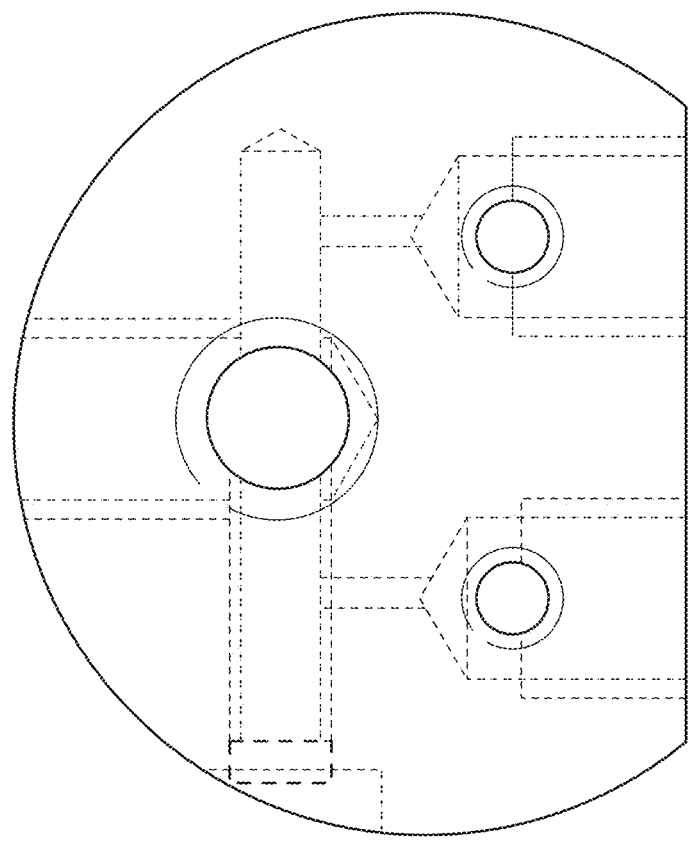
FIG. 2A shows a top view of an exemplary dual injection manifold. A single line (left) is split into two lines (right), providing a dual injection feed.
Figure 2B:
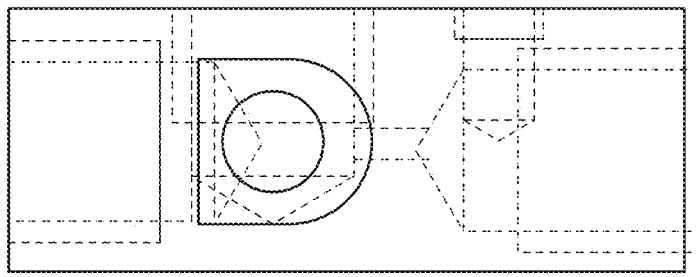
FIG. 2B shows a side view of the dual injection manifold of FIG. 2A.

The carbon dioxide is converted to a mixture of gaseous and solid carbon dioxide at the orifice; the ratio of solid to gas produced at the orifice depends on the proportion of carbon dioxide reaching the orifice that is liquid. If the carbon dioxide reaching the orifice is 100% liquid, the proportion of solid to gaseous carbon dioxide in the mix of solid and gaseous carbon dioxide exiting the orifice can approach 50%. The orifice may be any suitable diameter, such as at least $1/64$, $2/64$, $3/64$, $4/64$, $5/64$, $6/64$, or $7/64$ inch and/or no more than $2/64$, $3/64$, $4/64$, $5/64$, $6/64$, $7/64$, $8/64$, $9/64$, $10/64$, $11/64$, or $12/64$ inch, such as about $5/64$ inch, or about $7/64$ inch. The length of the orifice must be sufficient that liquid carbon dioxide passing through does not freeze; in addition, the orifice may be flared to prevent plugging. The orifice may be configured in a manifold. In certain embodiments, one or more drop-in orifices are used. These are separate fittings that supply an orifice of any desired dimensions, often in conjunction with one or more junctions for one or more sensors, and suitable junctions e.g., threaded junctions, that allow attachment at a desired location in a line. The use of a drop-in orifice allows rapid and simple substitution of a suitable orifice into a system, e.g., in systems in locales where certain dimensions are desired or required. In certain systems, a dual orifice manifold block is used that allows one valve to feed two orifices and two discharge lines. See, e.g., FIGS. 2A and 2B, which shows a single line coming into the manifold, splitting to provide carbon dioxide to two injection orifices, and two output junctions. Included is a threaded hole (left) for one or more sensors, e.g., temperature and pressure sensors, and two threaded holes (right), after each of the injection orifices, for one or more sensors, e.g., a pressure sensor.

Alternatively, individual injection orifices can be separately supplied (e.g., drop-in orifices, or separate manifold orifices). In general, such a manifold can be used with an initial and final gas injection to ensure that the orifice remains clear, and to pressurize the system so that when liquid is introduced into the line it will not convert to gas and solid until it reaches the orifice.

Typically, in a system using a gas purge, the process involves opening a gas valve to pressurize the system (e.g., for 1-10 seconds, for example 1-5 seconds, such as 2-4 seconds), then the liquid valve opens and overlaps with the gas valve (e.g., for 0.2-5 seconds, for example 0.4-2 seconds, such as 0.5-1.5 seconds), then the gas valve closes and the liquid valve remains open until the desired amount of carbon dioxide is injected into the destination system, e.g., concrete batch system. Then the gas valve opens and overlaps with the liquid valve (e.g., for 0.2-5 seconds, for example 0.4-2 seconds, such as 0.5-1.5 seconds), the liquid valve closes and the gas valve remains open to clear out the system (e.g., for 1-20 sec, for example 2-15 second, e.g., 5-10 seconds), and then the gas valve closes and the system remains idle until the next injection. This can be incorporated into, e.g., a volumetric injection system with appropriate programming regarding signals and pulses.

It will be appreciated that any suitable number of injection orifices may be used, depending on how many separate flows of gaseous/solid carbon dioxide are desired, and appropriate fittings, for example, 2, 3, 4, 5, 6, 7, 8, 9, 10, or more than 10 injection orifices. In general, with a plurality of injection orifices, the injection protocol is similar to that for a single orifice system except each line exiting each injection orifice is monitored for blockage with downstream pressure sensors, rather than a single line as in a single injection orifice system. In certain embodiments, a dual orifice system is used. In dual orifice systems, a given flow of carbon dioxide may be sent to the destination in a shorter time, and/or flows may be sent to two different destinations, and/or flow may be sent to a single destination at two different points in the destination (e.g., two different points in a mixer such as a concrete mixer), which can allow for more efficient uptake of carbon dioxide at the destination. This can obviate problems of reliability and accuracy in certain systems, for example, in a twin shaft or roller mixer for concrete, or other systems with very short cycle times. Thus, a dual orifice system can allow for both greater delivery in a given time (e.g., up to 1.8× that of a single orifice system; due to thermodynamic changes within the system it does not reach the theoretical 2×) and more targeted delivery (to, e.g., two different points in a mixer) allowing, e.g. greater uptake efficiency. A dual orifice system may be manufactured and used in any suitable manner. For example, a steel manifold, such as a rolled steel or stainless steel manifold, can be full machined and contain one inlet and two outlets, with suitable orifices, e.g., orifices of sizes described herein, such as 7/64" orifices. The manifold can have connections for two downstream pressure sensors and a connection for the temperature sensor and upstream pressure sensor tee to reduce the mass of the system and the time that liquid and metal are in contact. See, e.g., FIGS. 2A and 2B. The dual injection system calculates the flow rate through both orifices. The dual injection system can also have an additional smooth bore discharge hose (second conduit, as described herein), additional injection nozzle, additional downstream pressure sensor with stand, and/or two points of discharge into the mixer.

The mixture of gaseous and solid carbon dioxide is then led from the orifice to its place of use, e.g., in the case of concrete operation such as a ready-mix operation or a precast operation, to a position to deliver the mixture to a mixer containing a cement mix comprising hydraulic cement and water, such as a drum of a ready-mix truck or a central mixer, by a second conduit, also referred to herein as a delivery conduit or delivery line. The second conduit is configured to deliver the mixture of solid and gaseous carbon dioxide to its place of use with very little conversion of solid to gaseous carbon dioxide, so that the mixture of solid and gaseous carbon dioxide delivered at the point of use is still at a high ratio of solid to gas, for example, the proportion of solid carbon dioxide in the mixture can be at least 35, 36, 37, 38, 39, 40, 41, 42, 43, 44, 45, 46, 47, 48, or 49% of the total.

The second conduit is typically configured to minimize friction along its length and also minimize heat exchange with the ambient atmosphere, and also provide a small total volume so that flow rate is maximized. For example, the second conduit can be a smooth bore conduit of relatively small diameter. Any suitable means may be used to provide a smooth bore for the second conduit, such as ensuring that no irregularities on the inside surface of the conduit occur and that there are no convolutions of the conduit. A material may be used that has a coating such as polytetrafluoroethylene (PTFE), which serves to keep the conduit bore smooth, so long as there are not substantial irregularities or convolution. The thermal mass of the hose is low due to the thin PTFE and small amount of stainless steel braiding. It can be insulated, e.g., with conventional pipe insulation. The conduit generally should be smooth (not convoluted) to allow smooth flow, and it must be able to withstand low temperatures; i.e., the dry ice (snow) that passes through the hose will be at a temperature of −78° C. Exemplary second conduits are the SmoothFlex series produced by PureFlex, Kentwood, MI. The materials used in the SmoothFlex series and weight make these good candidates to ensure minimum warming during its transit from the orifice to its destination. This maximizes the solid carbon dioxide fraction as the sublimation rate is kept low. The second conduit may be flexible or rigid or a combination thereof, in certain embodiments at least a portion can be flexible in order to be easily positioned or for changing position. The second conduit can conduct the mixture of solid and gaseous carbon dioxide for a long distance with little conversion of solid to gas, since the transit time through the conduit is relatively short due to the force generated from the sudden conversion of the liquid carbon dioxide to gas and subsequent expansion of 500-fold or more, forcing the mixture of gas and solid through the conduit. The inside diameter of the second conduit may be any suitable inside diameter to allow rapid passage of the carbon dioxide, for example, at least 0.1, 0.2, 0.3, 0.4, 0.5, 0.6, 0.7, 0.8, 0.9, or 1.0 inch, and/or not more than 0.2, 0.3, 0.4, 0.5, 0.6, 0.7, 0.8, 0.9, 1.0, 1.5, or 2 inch, such as 0.5 inch, or 0.625 inch, or 0.750 inch. The second conduit may be, e.g., at least 5, 10, 15, 20, 25, 30, 35, 40, 45, 50, 55, 60, 65, 70, 80, 90, or 100 feet long, in order to reach the final point where carbon dioxide will be used; length of the second conduit will in general depend on the particular operational setup in which carbon dioxide is being used. Because the first conduit typically is kept as short as possible, and the second conduit must be a length suitable to reach to point of use, which is often far from the injector orifice, the ratio of length of the second conduit to that of the first conduit can be at least 0.5, 0.7, 1.0, 1.2, 1.5, 2.0, 2.5, 3.0, 3.5, 4.0, 4.5, 5.0, 6, 7, 8, 9, or 10, or greater than 10. For example, the first conduit can be not more than 10 feet long while the second conduit may be at least 20, 30, 40, or 50 feet long. The second conduit may be placed inside another conduit, such as a loose fitting plastic hose, e.g., to prevent kinking during installation. The second conduit may be further insulated, e.g., with pipe insulation, to further minimize heat gain between injections from external sources.

In certain embodiments, admixture may be added to the carbon dioxide stream as it is delivered. The admixture can be, e.g., liquid. A small amount of liquid admixture can be bled into the discharge line after the orifice. The liquid may quickly freeze into solid form and be carried along with the carbon dioxide into the mixer. The frozen admixture is carried into the concrete mix along with the carbon dioxide, and melts or sublimes in the concrete mixture. This method is particularly useful when adding an admixture that has a synergistic effect with the carbon dioxide and/or an admixture that can influence the carbon dioxide mineralization reaction. For example, the admixture TIPA imparts benefits at very small doses, but it is typically added in liquid cocktail form so the small dose is accompanied with a larger amount of carrier fluid. If only the active ingredient were added then the small amount could be distributed over the dose of carbon dioxide. Admixtures systems could be smaller if the chemicals do not need to be added in dilute solutions.

The second (delivery or output) conduit can be attached to a third conduit, also referred to herein as a targeting conduit or expansion conduit. The third conduit can be a larger diameter than the second conduit, to allow for the solid/gas carbon dioxide to slow and mix, so that the solid carbon dioxide clumps together into larger pellets. This is useful, e.g., in a concrete operation where carbon dioxide is added to a mixing cement mix, so that pellets are large enough to be subsumed in the mixing cement before sublimating to a significant degree. The third conduit may be any suitable inside diameter, so long as it allows for sufficient slowing and clumping for the desired use, for example, at least at least 0.5, 0.6, 0.7, 0.8, 0.9, 1.0, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.2, 3.4, 3.8, or 4 inches, and/or not more than 0.6, 0.7, 0.8, 0.9, 1.0, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.2, 3.4, 3.8, 4 or 4.5 inches, such as 0.5-4 inches, or 0.5-3 inches, or 0.5-2.5 inches, or about 2 inches. The third conduit may be any suitable length to allowed desired clumping without slowing the carbon dioxide so much, or for so long, that material sticks to the walls or sublimates to a significant degree, e.g., a length of at least 6, 8, 10, 12, 14, 16, 18, 20, 22, 24, 28, 32, 36, 40, 44, or 48 inches, and/or not more than 8, 10, 12, 14, 16, 18, 20, 22, 24, 28, 32, 36, 40, 44, 48, 54, 60, 72, 84 inches, for example, 2-8 feet, or 2-6 feet, or 3-6 feet, or 3-5 feet. The third conduit is typically made of a material that is rigid, and durable enough to withstand the conditions in which it is used. For example, in a concrete mixing operation, the third conduit is often positioned in the chute through which materials, including aggregates, are funneled into the mixer, and comes into repeated contact with the moving aggregates, and should be of sufficient strength and durability to withstand repeated contact with the aggregates on a daily basis. This may be as much as 20 tons of material per truck, and 400-500 trucks per month. Conventional snow horn materials will not withstand such an environment. A suitable material is stainless steel, of suitable diameter, such as ⅛ to ¼ inch. In some cases it may be desirable to install an armor, e.g., in high-wear location, to increase the thickness, e.g., to ½ inch or even thicker. The third conduit is typically a high-wear item and may be serviced periodically, e.g., every 3-6 months depending on production. In certain operations, e.g., where the third conduit is not moved, or rarely moved or moved only slightly between runs, the third conduit may be the final conduit in the system. This is the case, e.g., in stationary mixers, such as central mixers used in, e.g., ready-mix operations.

In some operations, such as concrete mix operations in which mix materials are dropped into the drum of a ready-mix truck, materials are dropped through a chute which ends in a flexible portion, to allow the chute to be placed in the hopper of the drum and then removed. In such a situation, a fourth conduit of flexible material, also called an end or final conduit herein, may be attached to the third conduit in order to move with the flexible chute used to drop the concrete materials. The inside diameter of the flexible conduit is such that it fits snugly over the outside diameter of the third conduit. Any material of suitable flexibility and durability may be used in the fourth conduit, such as silicone.

Also provided herein is a control system for the carbon dioxide delivery system. In general, such a system can include a batch control system for a concrete production operation, and/or an intermediate system that receives input from the carbon dioxide delivery system and informs the batch control system of the status of carbon dioxide delivery for a given batch. Typically, the batch control system is already in place at the concrete production operation, and is modified for batches to include carbon dioxide by treating the carbon dioxide as an admixture to be added to a concrete batch in a certain predetermined amount, depending on the carbonated mix design for a particular carbonated batch. Admixture addition is usually controlled in one of two ways: volumetric or weight based.

In a volumetric system, the batch control system begins sending a continuous signal to an admixture addition unit, for example as a 120V signal from the batch control system, that activates the admixture addition unit to begin adding admixture to the mix; admixture addition continues as long as the signal continues. The signal may begin at any suitable time before, during, or after the addition of concrete ingredients to the mixer, and/or at a suitable time during mixing, and can be coordinated with timing of addition of one or more ingredients, such as addition of cement. For example, the signal can be programmed to be sent when a certain percentage of the total cement has been added to the mix, such as 50%, or any other suitable amount at which to commence addition of the admixture. The admixture addition unit sends a series of electrical pulses back to the batch control system, each pulse corresponding to a certain incremental amount of admixture that has been added to the mix by the admixture addition unit. The batch control system counts the pulses until the total matches a predetermined number of pulses, corresponding to the desired total amount of admixture for the particular batch, at which point it switches off the signal to the admixture addition unit, and admixture additions to the mix stops. In a volumetric admixture setup, the intermediate system receives the start signal from the batch control unit, e.g., a 120V signal, and commences carbon dioxide delivery. The intermediate system can be configured to perform a sequence of actions that allow properly controlled start-up of carbon dioxide delivery. The intermediate system also receives information from the carbon dioxide delivery system that indicates the amount of carbon dioxide delivered and sends a series of pulse signals back to the batch control system, each of which corresponds to an incremental amount of carbon dioxide added to the mixer; the batch control system counts the signals and stops the admixture addition signal to the intermediate system at a predetermined number of pulses corresponding to a predetermined amount of carbon dioxide to be added for the particular batch. On cessation of the signal from the batch control system, the intermediate system stops addition of carbon dioxide by sending appropriate signals to appropriate actuators of the carbon dioxide delivery system. The intermediate system can be configured to perform a sequence of actions that allow properly controlled shutdown of carbon dioxide delivery. Any suitable method may be used to inform the intermediate system, based on information received from the carbon dioxide delivery system, as to the incremental amount of carbon dioxide added at a given time. For example, the intermediate system may receive signals from sensors of the carbon dioxide delivery system that allow it to calculate a flow rate for the carbon dioxide being delivered, such as pressure and temperature signals as described herein or, e.g., in U.S. Pat. No. 9,758,437, from which it determines a flow rate, and the intermediate system may also receive information as to time of flow, allowing calculation of an amount. When the calculated amount added reaches the incremental amount, a signal is sent back to the batch control unit, and such signals continue with each additional incremental amount until the total is reached and the admixture addition signal from the batch control system ceases.

In a weight-based system, the batch control system calculates an appropriate weight of admixture to be added to a particular mix and activates an admixture filling system to fill an admixture holder with the calculated weight of admixture. The admixture holder is positioned on a load cell which sends a signal back to the batch control system corresponding to the weight of admixture in the admixture holder; when the load cell signal corresponds to the desired weight, the batch control system ceases filling the admixture holder. The batch control system begins batching the concrete mix and, as with the volumetric system, at a predetermined point in the mix batching, e.g., at a predetermined point in cement addition, the batch control system signals the admixture addition unit to open the admixture holder to the mix, allowing admixture to leave the holder and enter the mix. The batch control system receives a signal from the load cell at the admixture holder and when the signal corresponds to zero or substantially zero, addition ceases; if the signal gets "stuck" at a weight above zero, the batch control system may send a signal to an operator to check the admixture addition unit, or in some other way adjust the admixture addition unit. In systems and methods described herein, in a weight-based admixture addition system, appropriate signals are sent from the intermediate system to the batch control system to simulate load cell signals from filling up a simulated admixture holder, and load cell signals from emptying the simulated admixture holder. This simulation is, e.g., to allow the intermediate unit to determine the quantity of CO2 needed in the batch (i.e. the maximum during the filling signal ramp). In reality, there is no admixture holder for carbon dioxide, and the load cell signal for "filling up" the admixture holder is completely simulated. The simulated load cell signal corresponding to "emptying" the admixture holder is based on amounts of carbon dioxide added to the mix, determined in the same manner as for the volumetric system. The signal sent to the batch control system corresponds to a zero weight in the "admixture holder" when the desired predetermined amount of carbon dioxide has been reached. Start-up and shutdown of the carbon dioxide delivery system may be controlled by the intermediate system as described for the volumetric system, above.

Materials for use in carbon dioxide delivery systems and methods provided herein may be provided as one or more discrete units.

For example, the injection orifice, or, in the case of a dual system, dual injection orifices, may be housed in an carbon dioxide injector unit, or box. The injector unit may further include appropriate sensors, e.g., one or more pressure sensors, such as at least 2, at least 3, at least 4, at least 5, or at least 6 such sensors, and/or one or more temperature sensors, such as described herein. In systems where a gas purge is used, two intake conduits reach the injector unit, a gas conduit and a liquid conduit, from the carbon dioxide source, and the unit is configured to allow attachment of the conduits to the unit, as well as interior conduits to continue each conduit to its junction with the orifice or other appropriate place. In other systems, such as where a heat source is used to keep the injection orifice or orifices clear, a single conduit for liquid carbon dioxide may reach the injector unit which is configured for attachment of the single conduit. In such a system, the unit can include a heat source, heat sink, and any other appropriate materials to heat the injector and other materials as described herein. Generally, one conduit will leave the injector unit corresponding to each injector; in a mono injector system there is one such conduit and in a dual injector system there are two conduits; the injector unit is configured to allow attachment of the one or two output conduits to the unit. In addition, the injector unit is configured to send information to an intermediate system, as described above, such as information from the pressure and/or temperature sensors. In some cases, some or all of the information may be sent wirelessly and one or more wireless transmission units are included in the unit and/or to be attached to the unit; in some cases some or all of the information is sent via a wired connection, and the unit may have 1, 2, 3, 4, 5, 6, 7, 8, 9, 10, or more than 10 ports to accommodate a connector, such as a wired connector, that connects with the intermediate system. The injection unit can include suitable housing, such as housing with appropriate ports for connectors (or few or no ports if wireless connection is used) and attachment points for conduits, so that a customer can easily make the appropriate connections and the injector unit is configured for use.

An intermediate processing unit, or box, may also be provided. This unit is configured to receive input from a batch control system and from the carbon dioxide delivery system, and to send output to the batch control system and the carbon dioxide delivery system, such as described for volumetric and/or weight-based systems. Some or all of the input and/or output may be wireless, and the intermediate processing system unit may include one or more wireless reception units to receive signals from the batch control system and/or from the carbon dioxide delivery system (e.g., from an injection box, and/or from other sensors), and/or one or more wireless transmission units to send signals to the batch control system and/or to the carbon dioxide delivery system (e.g., to the injection box). In addition or alternatively, some or all of the signals may be received via physical connectors, such as wires, and the intermediate system unit may include one or more ports to receive connectors, such as wires, from the batch control system and/or from the injection box and/or from other sensors. For example, the intermediate system unit may have a port for a connector, such as a wire, to the batch control system, or two ports for two connectors, such as wires, or three ports for three connectors, such as wires, or any other suitable number of connectors, such as wires, to the batch control system. The intermediate processing system unit may have one or more ports for one or more connectors, such as wires, from the injection box and/or from other sensors (such as carbon dioxide sensors in a masonry unit), such as 1, 2, 3, 4, 5, 6, 7, 8, 9, 10, 11, 12, 13, 14, 15, 16, 17, 18, 19, 20 ports, or any range therebetween. The intermediate processing unit also contains a processing system to receive signals, e.g., from various sensors such as at the injection box and/or elsewhere and/or from the batch control system; to process the signals, e.g., to calculate a carbon dioxide flow rate, a time, an amount of carbon dioxide delivered, and/or other suitable calculations; and to send signals, e.g., as a result of one or more calculations, e.g., to one or more actuators such as at the injection box and/or elsewhere, and/or to the batch control system. The processor may be in any suitable form, such as a programmable logic controller (PLC), optionally with a human machine interface (HMI), or as a printed circuit board; in certain embodiments, the processor comprises a printed circuit board. The unit may also contain one or more transmission units, e.g., telemetry units to send information to a remote location, e.g., a central processing unit or units, which may receive such information from a plurality of such units in a plurality of locations, such as 1, 2, 3, 4, 5, 6, 7, 8, 9, 10, 12, 15, 20, 30, 40, 50, 70, 100, 150, 200, 300, 400, 500, 700, 1000 locations, or any range therebetween. The intermediate system unit may be housed in a suitable enclosure, such as a box, so that a customer need only hook up the box to the appropriate connectors, if used, for the unit to be operational. In the case of a wireless system, the box may be operational without any connections.

Also provided herein are kits that contain materials to set up and control a carbon dioxide delivery system as described herein. Such kits can be tailored to the particular need of a customer, and can include 1) single injector kit for dry batch (generally, a ready-mix concrete production facility where mixing and carbonation occurs in the drum of a ready-mix truck); 2) dual injector kit for dry batch; 3) single injector kit for wet batch (generally, a ready-mix concrete production facility where mixing and carbonation occurs in a stationary central mixer and the carbonated mix is then sent to the drum of a ready-mix truck); 4) dual injector kit for wet batch; 5) single injector kit for masonry (generally, a precast operation using a stationary mixer); 6) dual injector kit for masonry. Kits can also include written materials, such as an electronic schematic, overall schematic, directions for assembly; alternatively or additionally, such materials and/or directions can be provided remotely, e.g., via a website, which may include written directions, pictorial directions, and/or instructional videos. The kits can allow a customer to set up a carbon dioxide delivery system on their own, or allow set-up by installers, or a combination thereof. It will be appreciated that systems may also be used with more than 2 injection orifices, for example 3, 4, 5, 6, 7, 8, 9, 10, or more than 10 injector orifices, with appropriate fittings and conduits.

Generally, each kit includes at least 1) an injector unit, either single or dual, as described above; 2) an intermediate system unit, as described above; 3) a first liquid input conduit to connect the injector unit to a liquid portion of a carbon dioxide source; 4) optionally, a second gas input conduit to connect the injector unit to a gas portion of a liquid carbon dioxide source (in units where gas blowout is used to keep the injector clear); 5) one or two output conduits to direct solid/gas carbon dioxide produced at the injector box toward a mixer (one conduit for single injection, two conduits for dual injection); and 6) one or two expansion conduits (depending on if single or dual system) to be attached to the output conduit or conduits, for expansion and slowing of the carbon dioxide gas/solid, as described herein. A kit can also include one or more of. 7) fittings to connect conduits to the injector box, 8) fittings to connect conduits to the carbon dioxide source, 9) connectors, such as wires, to connect sensors in the injector unit, and, optionally, other sensors such as carbon dioxide sensors, with the intermediate system unit (if wireless not used), connectors, such as wires, to connect the intermediate system unit with the batch control system (if wireless not used). In some cases, a kit can include one or reducers to reduce (or expand) conduit connection between two conduits or a conduit and another unit. A kit can also include pipe insulation, aluminum tape, extra connectors (e.g. wires), extra fittings, ethernet cables, USB drives, and the like.

Kits for use in dry batch can also include one or two final conduits (depending on if single or dual system) to attach to the above conduit, that is flexible material such as silicone, to allow movement with the batching systems of the ready-mix trucks; an appropriate clamp or clamps can be included for secure attachment. Additional final conduits can optionally be included so a user can replace the original, e.g., when it becomes worn. Wet batch and masonry kits will generally not contain such a conduit or conduits because the mixer is stationary and the expansion conduit can be attached directly to the mixer with little or no movement during or between batches. Kits may also include one or more carbon dioxide sensors; for example, a masonry kit may include 1, 2, 3, 4, 5, 6, 7, 8 carbon dioxide sensors, or any range therebetween. Such sensors can be placed during installation at appropriate points on or around the mixer, and can detect carbon dioxide levels. Such detection can serve a dual purpose: first, worker safety, in that if carbon dioxide levels go over a certain safety level, the system can be programmed to sound an alarm and/or cease carbon dioxide delivery, and second, efficiency, in that if a carbon dioxide leak is detected at a leak point on the mixer, or at a level above a certain threshold on the mixture, the system can be programmed to adjust carbon dioxide delivery, e.g., reduce rate and/or amount, on that batch or subsequent batches.

In order to provide uniformity, kits can be supplied with set lengths of conduits. In general, it is desirable to keep input liquid carbon dioxide conduits to a predetermined, set length, if calibration curves will be used to determine flow, as the calibration curves can be made with the same length of the same type of conduit; any suitable length may be used, such as lengths as described herein. Typically, the user is instructed not to modify the length of the input liquid carbon dioxide conduit. Materials used in input conduits can be any suitable material, such as described herein, such as braided stainless steel, and any suitable inner diameter (ID) dimensions, also as described herein. Output conduit or conduits can be supplied in a set length, such as 60 feet, or any other suitable length, so that it is long enough to reach from the injector box to a mixer (or mixers in the case of dual injection). In some cases, users may shorten the conduit before use. Materials and ID may be any suitable materials and ID, as described herein, such as smooth bore materials, for example a PTFE inner coating. Expansion conduits are typically of rigid and strong material, such as stainless steel, and are also sent to the user in a predetermined length, such as 4 feet; though users may need to size as appropriate for their system, it is desirable to keep as close to the supplied length as possible. Final conduit, such as a flexible silicone conduit, can also be supplied in a set length, to be cut by the user as appropriate for their system.

A liquid carbon dioxide source can be provided to be used with the above systems. In certain cases, the liquid carbon dioxide source is provided with custom-tailored fittings to match materials from the carbon dioxide delivery system.

In certain embodiments, a token system is used as a security measure. For example, at intervals (e.g., monthly) a unique key (or "token") is generated and distributed to the customer if the customer has no outstanding fees; if there are outstanding fees or other irregularities, the token may be withheld. The customer enters the token into the system, e.g., via touchscreen or on a web interface display (acts the same as the touch screen but is displayed on batching computer, that is, is appropriate for a potential installation of systems without touchscreen). At the end of the time interval (e.g., month) the system program disables the system unless the unique key has been entered, for example, without the unique key the system goes into idle mode, and even if a start injection signal is sent to the system, it is ignored. The same can happen if, e.g., the network connection of the system is lost for a period of time (for example, if a customer disables the network signal in an attempt to run the system without the unique key). Additionally or alternatively, outside connectors may be used on the enclosure for inputs and outputs that allows the provider to manually or automatically disable the system if any attempt is made to alter the enclosure. There is no reason for the customer or installer to open the enclosure; in the event of a failed unit the customer can be requested to unhook the external connections and a replacement unit can be sent to be swapped out with the failed unit.

Example 1

A ready-mix concrete plant provides dry batching in its trucks; i.e., dry concrete ingredients are placed in the drum of a truck with water and concrete is mixed in the trucks. It is desired to deliver carbon dioxide to the trucks while the concrete is mixing, where the carbon dioxide is a mixture of solid and gaseous carbon dioxide in a high ratio of solid carbon dioxide, e.g., at least 40% solid carbon dioxide. There is no room in the batching facility for a tank of liquid carbon dioxide to feed the line to the truck, so the liquid carbon dioxide tank is located 50 feet or more from the final destination. It is desired to deliver a dose of 1% carbon dioxide by weight of cement (bwc) to successive batches of concrete in different trucks over the course of a day. Trucks may be full loads of 10 cubic yards of concrete, or partial loads with as little as 1 cubic yard of concrete. The typical batch of concrete uses 15% by weight cement, and a typical cubic yard of concrete has a weight of 4000 pounds, so a cubic yard of concrete will contain 600 pounds of cement. Thus, the lowest dose of carbon dioxide will be 6 pounds and the highest dose 60 pounds. The time between doses averages at least 10 minutes.

Liquid carbon dioxide is led from a tank to an orifice configured to convert the liquid carbon dioxide to solid and gaseous carbon dioxide upon its release to atmospheric pressure via a 10-foot line of ⅜ inch ID braided stainless steel. Upon its release through the orifice, the mixture of solid and gaseous carbon dioxide is led toward the drum of a ready mix truck via a 50-foot line of ⅝ inch ID, smooth bore and insulated. This line terminates in a 2 inch ID stainless steel tube of ¼ inch thickness and 2 feet long that is contained inside the chute that leads concrete ingredients from their respective storage containers to the drum of the truck; the stainless steel line in turn terminates in a flexible section fitted over the steel tube that moves with the rubber boot at the end of the chute that flops into the hopper of the ready-mix truck.

The system is calibrated against a calibration system using the same length, diameter, and material of the initial conduit, tested for flow rate under a variety of temperature and pressure conditions. Appropriate pressures and temperatures are taken during the operation of the system for a given batch and matched to the appropriate calibration curve or curves to determine flow rate and length of time needed to deliver the desired dose, and carbon dioxide flow is ceased when the system has determined that a dose of 1% bwc has been delivered to a truck.

Ambient temperatures of the day range between 1° and 25° C. Each truck remains in the loading area while materials are loaded for a maximum of 90 seconds, and delivery time for the carbon dioxide is less than 45 seconds.

The system delivers appropriate doses to achieve 1% carbon dioxide bwc, at a ratio of solid/total carbon dioxide of at least 0.4, over the course of 8 hours, with an average of 5 loads per hour (40 loads total), with a precision of less than 10% coefficient of variation.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A kit for retrofitting a ready-mix or precast concrete operation to supply gaseous and solid carbon dioxide to concrete in the operation, wherein the operation mixes concrete in a mixer, comprising
    (i) a first conduit configured on a proximal end for connection to a liquid portion of a liquid carbon dioxide container and on its distal end for connection to a carbon dioxide injector unit;
    (ii) the carbon dioxide injector unit, comprising
        (a) a first carbon dioxide injection orifice,
        (b) an internal liquid carbon dioxide input conduit operably connected at a distal end to the first carbon dioxide injection orifice and at its proximal end to a connector for the first conduit, wherein the internal liquid carbon dioxide input conduit comprises a valve proximal to the first carbon dioxide injection orifice, and
        (c) a connector, distal to the first carbon dioxide injection orifice, for connecting to a second conduit,
        (d) a first pressure sensor for producing a first signal to be transmitted to a first receiver, and
        (e) a first temperature sensor for producing a second signal to be transmitted to a second receiver;
    (iii) the second conduit, configured on a proximal end to connect with the connector of (ii)(c) and configured on a distal end to connect with a third conduit;
    (iv) the third conduit, configured on its proximal end to connect with the second conduit; and
    (v) an intermediate processing unit, comprising
        (a) the first receiver,
        (b) the second receiver,
        (c) a processing system operably connected to the first and second receivers, wherein the processing system is configured to process the first and second signals and to produce a first output signal and a second output signal, the first and second output signals based, at least in part, on said processing, wherein the intermediate processing unit is configured to transmit the first output signal to a third receiver in the carbon dioxide injector unit and to transmit the second output signal to a batch control system of the ready-mix or precast concrete operation.

2. The kit of claim 1 wherein the third conduit comprises a connector on a distal end for connecting to the mixer.

3. The kit of claim 1 further comprising instructions for assembly of the kit and integration with the concrete operation, wherein the instructions are written, electronic, or a combination thereof.

4. The kit of claim 1 further comprising a fourth conduit configured at a proximal end to connect with the third conduit and open at a distal end.

5. The kit of claim 4 comprising fittings for the fourth conduit.

6. The kit of claim 4 further comprising a fifth conduit configured on a proximal end for connection to a gas portion of a liquid carbon dioxide container and on its distal end for connection to the carbon dioxide injector unit, wherein the carbon dioxide injector unit further comprises an internal gas carbon dioxide input conduit operably connected at its distal end to the internal liquid carbon dioxide input conduit between the valve and the first injection orifice and operably connected at its proximal to a connector for connecting to the fifth conduit.

7. The kit of claim 6 wherein the carbon dioxide injector unit further comprising a second carbon dioxide injection orifice; a connector, distal to the second carbon dioxide injection orifice for a sixth conduit; and the sixth conduit.

8. The kit of claim 1 further comprising fittings for the first, second, and third conduits.

9. The kit of claim 1 further comprising a carbon dioxide sensor for producing a third signal to be transmitted to a third receiver.

10. The kit of claim 9 wherein the third receiver is contained in the intermediate processing unit.

* * * * *